US011563697B2

(12) United States Patent
Dutta

(10) Patent No.: US 11,563,697 B2
(45) Date of Patent: Jan. 24, 2023

(54) MULTIPLE LABEL SPACES IN A LABEL SWITCHED ROUTER

(71) Applicant: Nokia Solutions and Networks Oy, Espoo (FI)

(72) Inventor: Pranjal Kumar Dutta, Sunnyvale, CA (US)

(73) Assignee: Nokia Solutions and Networks Oy, Espoo (FI)

( * ) Notice: Subject to any disclaimer, the term of this patent is extended or adjusted under 35 U.S.C. 154(b) by 100 days.

(21) Appl. No.: 16/798,896

(22) Filed: Feb. 24, 2020

(65) Prior Publication Data

US 2021/0266272 A1  Aug. 26, 2021

(51) Int. Cl.
*H04L 49/00* (2022.01)
*H04L 45/50* (2022.01)

(52) U.S. Cl.
CPC .......... *H04L 49/3009* (2013.01); *H04L 45/50* (2013.01)

(58) Field of Classification Search
None
See application file for complete search history.

(56) References Cited

U.S. PATENT DOCUMENTS

| | | | | |
|---|---|---|---|---|
| 8,014,395 B1* | 9/2011 | Aggarwal | ............. | H04L 45/507 370/392 |
| 2005/0125490 A1* | 6/2005 | Ramia | .................... | H04L 45/50 709/202 |
| 2007/0121486 A1* | 5/2007 | Guichard | ................ | H04L 45/28 370/216 |
| 2011/0194561 A1* | 8/2011 | Kompella | ............... | H04L 61/10 370/392 |
| 2012/0163190 A1* | 6/2012 | Jocha | ...................... | H04L 45/00 370/241.1 |
| 2013/0266012 A1* | 10/2013 | Dutta | .................... | H04L 45/507 370/392 |
| 2014/0269714 A1 | 9/2014 | Bryant et al. | | |
| 2015/0003463 A1* | 1/2015 | Li | ........................ | H04L 12/4641 370/395.53 |
| 2015/0124830 A1* | 5/2015 | Hu | ........................ | H04L 45/507 370/392 |

(Continued)

FOREIGN PATENT DOCUMENTS

WO  2019239173 A1  12/2019

OTHER PUBLICATIONS

Aggarwal, R., "MPLS Upstream Label Assignment and Context-Specific Label Space", Network Working Group, Request for Comments: 5331, Aug. 2008, 13 pages.

(Continued)

*Primary Examiner* — Andre Tacdiran
(74) *Attorney, Agent, or Firm* — Tong, Rea, Bentley & Kim, LLC

(57) ABSTRACT

A router includes a memory configured to store a plurality of label spaces for each label space type used in a communication system. The plurality of label spaces store labels that identify virtual links between nodes of the communication system. The router also includes a processor configured to allocate a plurality of label space identifiers to the plurality of label spaces and to route packets based on labels and label space identifiers included in the packets. The router further includes a transceiver configured to transmit or receive the packets including the labels and the label space identifiers.

35 Claims, 47 Drawing Sheets

```
                                                                    800

0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|         VLS-I                         | Exp |S|       TTL     |
+-+-+-+-+-+-+-+-+-+-+-+-+-+-+-+-+-+-+-+-+-+-+-+-+-+-+-+-+-+-+-+-+
|         Label Space ID                | Exp |S|       TTL     |
+-+-+-+-+-+-+-+-+-+-+-+-+-+-+-+-+-+-+-+-+-+-+-+-+-+-+-+-+-+-+-+-+
|         Label                         | Exp |S|       TTL     |
+-+-+-+-+-+-+-+-+-+-+-+-+-+-+-+-+-+-+-+-+-+-+-+-+-+-+-+-+-+-+-+-+
```

(56) References Cited

U.S. PATENT DOCUMENTS

2016/0156551 A1\* 6/2016 Gafni .................. H04L 45/24
370/392

OTHER PUBLICATIONS

Andersson, L., "LDP Specification", Network Working Group, Request for Comments: 5036, Oct. 2007, 135 pages.
Awduche, D., "RSVP-TE: Extensions to RSVP for LSP Tunnels", Network Working Group, Request for Comments: 3209, Dec. 2001, 61 pages.
Bashandy, A., "Segment Routing with MPLS Data Plane", Network Working Group, Internet Draft, May 1, 2019, 38 pages.
Braden, R., "Resource Reservation Protocol (RSVP)—Version 1 Functional Specification", Network Working Group, Request for Comments: 2205, Sep. 1997, 112 pages.
Filsfils, C., "Segment Routing Architecture", Internet Engineering Task Force (IETF), Request for Comments: 8402, Jul. 2018, 32 pages.
Gredler, H., "North-Bound Distribution of Link-State and Traffic Engineering (TE) Information Using BGP", Internet Engineering Task Force (IETF), Request for Comments: 7752, Mar. 2016, 48 pages.
Kompella, K., "Virtual Private LAN Service (VPLS) Using BGP for Auto-Discovery and Signaling", Network Working Group, Request for Comments: 4761, Jan. 2007, 28 pages.
Lasserre, M., "Virtual Private LAN Service (VPLS) Using Label Distribution Protocol (LDP) Signaling", Network Working Group, Request for Comments: 4762, Jan. 2007, 31 pages.
Lindem, A., "Extensions to OSPF for Advertising Optional Router Capabilities", Internet Engineering Task Force (IETF), Request for Comments: 7770, Feb. 2016, 15 pages.
Revidi, S., "BGP Link-State Extensions for Segment Routing", Inter-Domain Routing, Internet-Draft, Jun. 27, 2019, 31 pages.
Previdi, S., "IS-IS Extensions for Segment Routing", Internet Engineering Task Force (IETF), Request for Comments: 8667, Dec. 2019, 28 pages.
Psenak, P., "OSPF Extensions for Segment Routing", Open Shortest Path First IGP, Internet-Draft, Dec. 3, 2018, 29 pages.
Psenak, P., "OSPFv3 Extensions for Segment Routing", Internet Engineering Task Force (IETF), Request for Comments: 8666, Dec. 2019, 18 pages.
Rekhter, Y., "Carrying Label Information in BGP-4", Network Working Group, Request for Comments: 3107, May 2001, 8 pages.
Rosen, E., BGP/MPLS IP Virtual Private Networks (VPNs), Network Working Group, Request for Comments: 4364, Feb. 2006, 47 pages.
Rosen, E., "MPLS Label Stack Encoding", Network Working Group, Request for Comments: 3032, Jan. 2001, 23 pages.
Rosen, E., "Multicast in MPLS/BGP IP VPNs", Internet Engineering Task Force (IETF), Request for Comments: 6513, Feb. 2012, 88 pages.
Rosen, E., "Multiprotocol Label Switching Architecture", Network Working Group, Request for Comments: 3031, Jan. 2001, 61 pages.
Thomas, B., "LDP Capabilities", Network Working Group, Request for Comments: 5561, Jul. 2009, 12 pages.
Extended European Search Report in corresponding EP Application No. 21158604.5-1215, dated Jul. 15, 2021, 10 pages.

\* cited by examiner

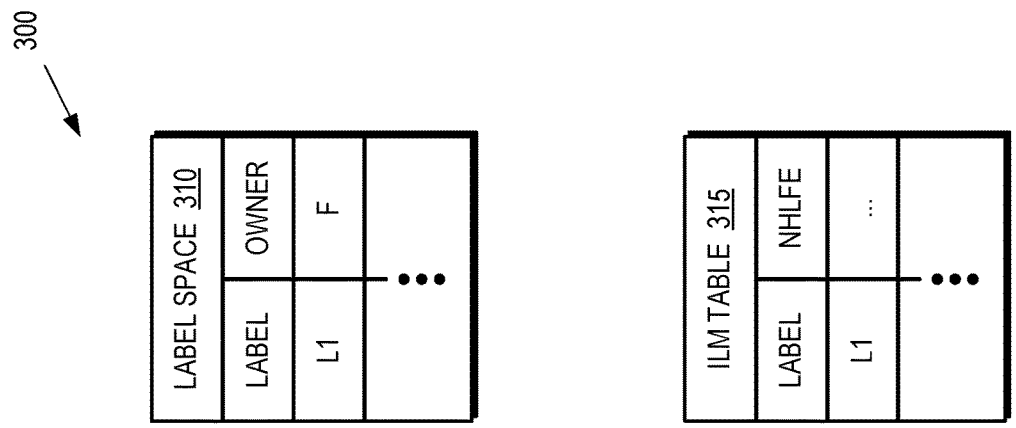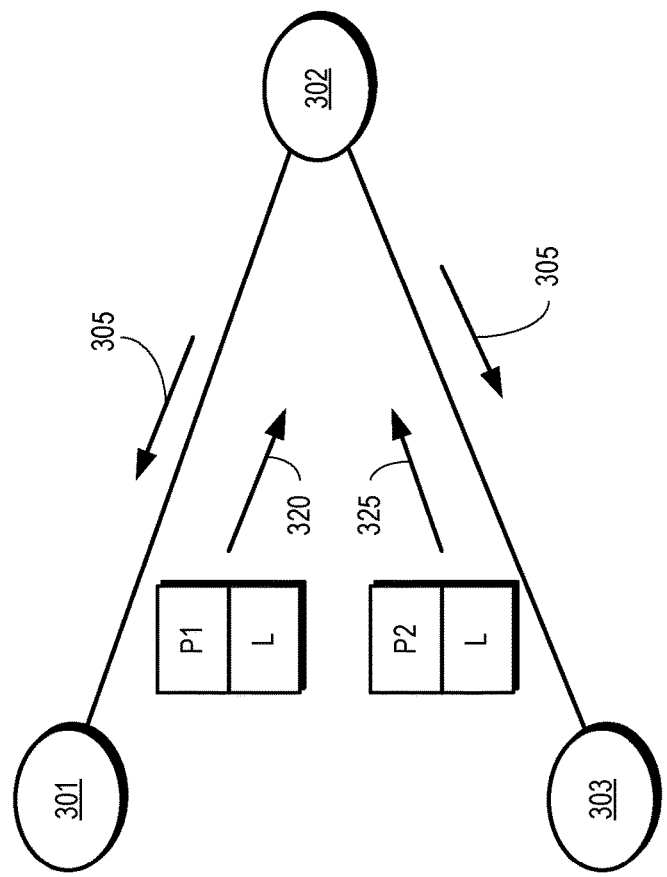
FIG. 3

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|                Label                  | Exp |S|       TTL     |
+-+-+-+-+-+-+-+-+-+-+-+-+-+-+-+-+-+-+-+-+-+-+-+-+-+-+-+-+-+-+-+-+
```

FIG. 5

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|          VLS-I                        | Exp |S|       TTL     |
+-+-+-+-+-+-+-+-+-+-+-+-+-+-+-+-+-+-+-+-+-+-+-+-+-+-+-+-+-+-+-+-+
|         Label Space ID                | Exp |S|       TTL     |
+-+-+-+-+-+-+-+-+-+-+-+-+-+-+-+-+-+-+-+-+-+-+-+-+-+-+-+-+-+-+-+-+
|           Label                       | Exp |S|       TTL     |
+-+-+-+-+-+-+-+-+-+-+-+-+-+-+-+-+-+-+-+-+-+-+-+-+-+-+-+-+-+-+-+-+
```

| LABEL SPACE ID_0 715 | |
|---|---|
| LABEL | OWNER |
| L | F1 |
| ⋮ | |

| LABEL SPACE ID_1 720 | |
|---|---|
| LABEL | OWNER |
| L | F2 |
| ⋮ | |

| LABEL SPACE ID_2 725 | |
|---|---|
| LABEL | OWNER |
| L | F3 |
| ⋮ | |

| LABEL SPACE ID_N-1 730 | |
|---|---|
| LABEL | OWNER |
| ... | ... |
| ⋮ | |

705

| ILM TABLE ID_0 735 | |
|---|---|
| LABEL | NHLFE |
| L | ... |
| ⋮ | |

| ILM TABLE ID_1 740 | |
|---|---|
| LABEL | NHLFE |
| L | ... |
| ⋮ | |

| ILM TABLE ID_2 745 | |
|---|---|
| LABEL | NHLFE |
| L | ... |
| ⋮ | |

| ILM TABLE ID_N-1 750 | |
|---|---|
| LABEL | NHLFE |
| ... | ... |
| ⋮ | |

FIG. 7

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|          VVLS-I                       | Exp |S|      TTL      |
+-+-+-+-+-+-+-+-+-+-+-+-+-+-+-+-+-+-+-+-+-+-+-+-+-+-+-+-+-+-+-+-+
|        Label Space ID                 | Exp |S|      TTL      |
+-+-+-+-+-+-+-+-+-+-+-+-+-+-+-+-+-+-+-+-+-+-+-+-+-+-+-+-+-+-+-+-+
|         Num Labels(P)                 | Exp |0|      TTL      |
+-+-+-+-+-+-+-+-+-+-+-+-+-+-+-+-+-+-+-+-+-+-+-+-+-+-+-+-+-+-+-+-+
|              Label 1                  | Exp |0|      TTL      |
+-+-+-+-+-+-+-+-+-+-+-+-+-+-+-+-+-+-+-+-+-+-+-+-+-+-+-+-+-+-+-+-+
|              Label 2                  | Exp |0|      TTL      |
+-+-+-+-+-+-+-+-+-+-+-+-+-+-+-+-+-+-+-+-+-+-+-+-+-+-+-+-+-+-+-+-+
//                                                             //
//                                                             //
+-+-+-+-+-+-+-+-+-+-+-+-+-+-+-+-+-+-+-+-+-+-+-+-+-+-+-+-+-+-+-+-+
|              Label P                  | Exp |0|      TTL      |
+-+-+-+-+-+-+-+-+-+-+-+-+-+-+-+-+-+-+-+-+-+-+-+-+-+-+-+-+-+-+-+-+
```

FIG. 9

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|1|0| Multi-Label Space Cap.  |           Length = 1            |
+-+-+-+-+-+-+-+-+-+-+-+-+-+-+-+-+-+-+-+-+-+-+-+-+-+-+-+-+-+-+-+-+
|S| Reserved  |
+-+-+-+-+-+-+-+-+
```

FIG. 22

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|0|0|Multi-Space Label(0x0208)|           Length                |
+-+-+-+-+-+-+-+-+-+-+-+-+-+-+-+-+-+-+-+-+-+-+-+-+-+-+-+-+-+-+-+-+
|     Label Space ID                                            |
+-+-+-+-+-+-+-+-+-+-+-+-+-+-+-+-+-+-+-+-+-+-+-+-+-+-+-+-+-+-+-+-+
|     Label                                                     |
+-+-+-+-+-+-+-+-+-+-+-+-+-+-+-+-+-+-+-+-+-+-+-+-+-+-+-+-+-+-+-+-+
```

FIG. 23

LABEL class = 16, C_Type = 1

```
 0                   1                   2                   3
 0 1 2 3 4 5 6 7 8 9 0 1 2 3 4 5 6 7 8 9 0 1 2 3 4 5 6 7 8 9 0
+-+-+-+-+-+-+-+-+-+-+-+-+-+-+-+-+-+-+-+-+-+-+-+-+-+-+-+-+-+-+-+
|       Length (8)              | Class-Num(16) |  C-Type(1)  |
+-+-+-+-+-+-+-+-+-+-+-+-+-+-+-+-+-+-+-+-+-+-+-+-+-+-+-+-+-+-+-+
|                            Label                            |
+-+-+-+-+-+-+-+-+-+-+-+-+-+-+-+-+-+-+-+-+-+-+-+-+-+-+-+-+-+-+-+
```

FIG. 24

LABEL class = 16, C_Type = 2

```
 0                   1                   2                   3
 0 1 2 3 4 5 6 7 8 9 0 1 2 3 4 5 6 7 8 9 0 1 2 3 4 5 6 7 8 9 0
+-+-+-+-+-+-+-+-+-+-+-+-+-+-+-+-+-+-+-+-+-+-+-+-+-+-+-+-+-+-+-+
|       Length (8)              | Class-Num(16) |  C-Type(2)  |
+-+-+-+-+-+-+-+-+-+-+-+-+-+-+-+-+-+-+-+-+-+-+-+-+-+-+-+-+-+-+-+
|                         Label Space ID                      |
+-+-+-+-+-+-+-+-+-+-+-+-+-+-+-+-+-+-+-+-+-+-+-+-+-+-+-+-+-+-+-+
|                            Label                            |
+-+-+-+-+-+-+-+-+-+-+-+-+-+-+-+-+-+-+-+-+-+-+-+-+-+-+-+-+-+-+-+
```

0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|     Type      |    Length     |     Flags     |   Algorithm   |
+-+-+-+-+-+-+-+-+-+-+-+-+-+-+-+-+-+-+-+-+-+-+-+-+-+-+-+-+-+-+-+-+
|                    SID/Index/Label (variable)                 |
+-+-+-+-+-+-+-+-+-+-+-+-+-+-+-+-+-+-+-+-+-+-+-+-+-+-+-+-+-+-+-+-+
```

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|     Type      |    Length     |     Flags     |    Weight     |
+-+-+-+-+-+-+-+-+-+-+-+-+-+-+-+-+-+-+-+-+-+-+-+-+-+-+-+-+-+-+-+-+

+-+-+-+-+-+-+-+-+-+-+-+-+-+-+-+-+-+-+-+-+-+-+-+-+-+-+-+-+-+-+-+-+
|                     System-ID (6 octets)                      |
+                               +-+-+-+-+-+-+-+-+-+-+-+-+-+-+-+-+
|                               |
+-+-+-+-+-+-+-+-+-+-+-+-+-+-+-+-+

+-+-+-+-+-+-+-+-+-+-+-+-+-+-+-+-+-+-+-+-+-+-+-+-+-+-+-+-+-+-+-+-+
|                    Label Space ID (4 octets)                  |
+-+-+-+-+-+-+-+-+-+-+-+-+-+-+-+-+-+-+-+-+-+-+-+-+-+-+-+-+-+-+-+-+
|                    SID/Label/Index (variable)                 |
+-+-+-+-+-+-+-+-+-+-+-+-+-+-+-+-+-+-+-+-+-+-+-+-+-+-+-+-+-+-+-+-+
```

FIG. 33

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|      Type     |     Length    |     Flags     |
+-+-+-+-+-+-+-+-+-+-+-+-+-+-+-+-+-+-+-+-+-+-+-+-+-+-+-+-+-+-+-+-+

+-+-+-+-+-+-+-+-+-+-+-+-+-+-+-+-+-+-+-+-+-+-+-+-+
|                      Range                    |
+-+-+-+-+-+-+-+-+-+-+-+-+-+-+-+-+-+-+-+-+-+-+-+-+-+-+-+-+-+-+-+-+
//              SID/Label Sub-TLV (variable)                   //
+-+-+-+-+-+-+-+-+-+-+-+-+-+-+-+-+-+-+-+-+-+-+-+-+-+-+-+-+-+-+-+-+
```

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+
|     Type      |    Length     |
+-+-+-+-+-+-+-+-+-+-+-+-+-+-+-+-+-+-+-+-+-+-+-+-+-+-+-+-+-+-+-+-+
|                      SID/Label (variable)                     |
+-+-+-+-+-+-+-+-+-+-+-+-+-+-+-+-+-+-+-+-+-+-+-+-+-+-+-+-+-+-+-+-+
```

FIG. 36

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+
|     Type      |    Length     |
+-+-+-+-+-+-+-+-+-+-+-+-+-+-+-+-+-+-+-+-+-+-+-+-+-+-+-+-+-+-+-+-+
|                        Label Space ID                         |
+-+-+-+-+-+-+-+-+-+-+-+-+-+-+-+-+-+-+-+-+-+-+-+-+-+-+-+-+-+-+-+-+
|                      SID/Label (variable)                     |
+-+-+-+-+-+-+-+-+-+-+-+-+-+-+-+-+-+-+-+-+-+-+-+-+-+-+-+-+-+-+-+-+
```

FIG. 37

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|      Type     |     Length    |     Flags     |    RESERVED   |
+-+-+-+-+-+-+-+-+-+-+-+-+-+-+-+-+-+-+-+-+-+-+-+-+-+-+-+-+-+-+-+-+
|           Range               | Prefix Length |     Prefix    |
+-+-+-+-+-+-+-+-+-+-+-+-+-+-+-+-+-+-+-+-+-+-+-+-+-+-+-+-+-+-+-+-+
//              Prefix (continued, variable)                   //
+-+-+-+-+-+-+-+-+-+-+-+-+-+-+-+-+-+-+-+-+-+-+-+-+-+-+-+-+-+-+-+-+
|                      SubTLVs (variable)                       |
+-+-+-+-+-+-+-+-+-+-+-+-+-+-+-+-+-+-+-+-+-+-+-+-+-+-+-+-+-+-+-+-+
```

FIG. 38

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|             Type              |            Length             |
+-+-+-+-+-+-+-+-+-+-+-+-+-+-+-+-+-+-+-+-+-+-+-+-+-+-+-+-+-+-+-+-+
|     Flags     |   Reserved    |     MT-ID     |   Algorithm   |
+-+-+-+-+-+-+-+-+-+-+-+-+-+-+-+-+-+-+-+-+-+-+-+-+-+-+-+-+-+-+-+-+
|                   SID/Index/Label (variable)                  |
+-+-+-+-+-+-+-+-+-+-+-+-+-+-+-+-+-+-+-+-+-+-+-+-+-+-+-+-+-+-+-+-+
```

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|         Type              |            Length                 |
+-+-+-+-+-+-+-+-+-+-+-+-+-+-+-+-+-+-+-+-+-+-+-+-+-+-+-+-+-+-+-+-+
|    Flags     |   Reserved   |    MT-ID      |    Algorithm    |
+-+-+-+-+-+-+-+-+-+-+-+-+-+-+-+-+-+-+-+-+-+-+-+-+-+-+-+-+-+-+-+-+
|                       Label Space ID                          |
+-+-+-+-+-+-+-+-+-+-+-+-+-+-+-+-+-+-+-+-+-+-+-+-+-+-+-+-+-+-+-+-+
|                     SID/Index/Label (variable)                |
+-+-+-+-+-+-+-+-+-+-+-+-+-+-+-+-+-+-+-+-+-+-+-+-+-+-+-+-+-+-+-+-+
```

FIG. 41

```
                                                              4200
                                                         ↙
 ......
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|              Type             |             Length            |
+-+-+-+-+-+-+-+-+-+-+-+-+-+-+-+-+-+-+-+-+-+-+-+-+-+-+-+-+-+-+-+-+
|     Flags     |    Reserved   |     MT-ID     |     Weight    |
+-+-+-+-+-+-+-+-+-+-+-+-+-+-+-+-+-+-+-+-+-+-+-+-+-+-+-+-+-+-+-+-+
|                     SID/Label/Index (variable)                |
+---------------------------------------------------------------+
```

FIG. 42

```
                                                              4300
                                                         ↙
 ......
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|              Type             |             Length            |
+-+-+-+-+-+-+-+-+-+-+-+-+-+-+-+-+-+-+-+-+-+-+-+-+-+-+-+-+-+-+-+-+
|     Flags     |    Reserved   |     MT-ID     |     Weight    |
+-+-+-+-+-+-+-+-+-+-+-+-+-+-+-+-+-+-+-+-+-+-+-+-+-+-+-+-+-+-+-+-+
|                          Neighbor ID                          |
+-+-+-+-+-+-+-+-+-+-+-+-+-+-+-+-+-+-+-+-+-+-+-+-+-+-+-+-+-+-+-+-+
|                     SID/Label/Index (variable)                |
+---------------------------------------------------------------+
```

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|              Type             |             Length            |
+-+-+-+-+-+-+-+-+-+-+-+-+-+-+-+-+-+-+-+-+-+-+-+-+-+-+-+-+-+-+-+-+
|     Flags     |    Reserved   |     MT-ID     |    Weight     |
+-+-+-+-+-+-+-+-+-+-+-+-+-+-+-+-+-+-+-+-+-+-+-+-+-+-+-+-+-+-+-+-+
|                         Label Space ID                        |
+-+-+-+-+-+-+-+-+-+-+-+-+-+-+-+-+-+-+-+-+-+-+-+-+-+-+-+-+-+-+-+-+
|                    SID/Label/Index (variable)                 |
+---------------------------------------------------------------+
```
4500

0                   1                   2                   3
     0 1 2 3 4 5 6 7 8 9 0 1 2 3 4 5 6 7 8 9 0 1 2 3 4 5 6 7 8 9 0 1
    +-+-+-+-+-+-+-+-+-+-+-+-+-+-+-+-+-+-+-+-+-+-+-+-+-+-+-+-+-+-+-+-+
    |            Type               |            Length             |
    +-+-+-+-+-+-+-+-+-+-+-+-+-+-+-+-+-+-+-+-+-+-+-+-+-+-+-+-+-+-+-+-+
    |                       SID/Label (variable)                    |
    +-+-+-+-+-+-+-+-+-+-+-+-+-+-+-+-+-+-+-+-+-+-+-+-+-+-+-+-+-+-+-+-+
```

0                   1                   2                   3
     0 1 2 3 4 5 6 7 8 9 0 1 2 3 4 5 6 7 8 9 0 1 2 3 4 5 6 7 8 9 0 1
    +-+-+-+-+-+-+-+-+-+-+-+-+-+-+-+-+-+-+-+-+-+-+-+-+-+-+-+-+-+-+-+-+
    |            Type               |            Length             |
    +-+-+-+-+-+-+-+-+-+-+-+-+-+-+-+-+-+-+-+-+-+-+-+-+-+-+-+-+-+-+-+-+
    |                         Label Space ID                        |
    +-+-+-+-+-+-+-+-+-+-+-+-+-+-+-+-+-+-+-+-+-+-+-+-+-+-+-+-+-+-+-+-+
    |                       SID/Label (variable)                    |
    +-+-+-+-+-+-+-+-+-+-+-+-+-+-+-+-+-+-+-+-+-+-+-+-+-+-+-+-+-+-+-+-+
```

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|              Type             |             Length            |
+-+-+-+-+-+-+-+-+-+-+-+-+-+-+-+-+-+-+-+-+-+-+-+-+-+-+-+-+-+-+-+-+
|     Flags     |   Algorithm   |           Reserved            |
+-+-+-+-+-+-+-+-+-+-+-+-+-+-+-+-+-+-+-+-+-+-+-+-+-+-+-+-+-+-+-+-+
|                     SID/Index/Label (variable)                |
+-+-+-+-+-+-+-+-+-+-+-+-+-+-+-+-+-+-+-+-+-+-+-+-+-+-+-+-+-+-+-+-+

|                     SID/Index/Label (variable)                |
+-+-+-+-+-+-+-+-+-+-+-+-+-+-+-+-+-+-+-+-+-+-+-+-+-+-+-+-+-+-+-+-+
+                                                               +
```

FIG. 53

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|              Type             |            Length             |
+-+-+-+-+-+-+-+-+-+-+-+-+-+-+-+-+-+-+-+-+-+-+-+-+-+-+-+-+-+-+-+-+
|     Flags     |     Weight    |           Reserved            |
+-+-+-+-+-+-+-+-+-+-+-+-+-+-+-+-+-+-+-+-+-+-+-+-+-+-+-+-+-+-+-+-+
|                    SID/Label/Index (variable)                 |
+---------------------------------------------------------------+
```

FIG. 54

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|              Type             |            Length             |
+-+-+-+-+-+-+-+-+-+-+-+-+-+-+-+-+-+-+-+-+-+-+-+-+-+-+-+-+-+-+-+-+
|     Flags     |     Weight    |           Reserved            |
+-+-+-+-+-+-+-+-+-+-+-+-+-+-+-+-+-+-+-+-+-+-+-+-+-+-+-+-+-+-+-+-+
|                          Neighbor ID                          |
+-+-+-+-+-+-+-+-+-+-+-+-+-+-+-+-+-+-+-+-+-+-+-+-+-+-+-+-+-+-+-+-+
|                    SID/Label/Index (variable)                 |
+---------------------------------------------------------------+
```

FIG. 55

Figure 43: SID/Label Sub-TLV in OSPFv3

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|            Type               |            Length             |
+-+-+-+-+-+-+-+-+-+-+-+-+-+-+-+-+-+-+-+-+-+-+-+-+-+-+-+-+-+-+-+-+
|                       SID/Label (variable)                    |
+-+-+-+-+-+-+-+-+-+-+-+-+-+-+-+-+-+-+-+-+-+-+-+-+-+-+-+-+-+-+-+-+
```

FIG. 63

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|              Type             |             Length            |
+-+-+-+-+-+-+-+-+-+-+-+-+-+-+-+-+-+-+-+-+-+-+-+-+-+-+-+-+-+-+-+-+
|                          Label Space ID                       |
+-+-+-+-+-+-+-+-+-+-+-+-+-+-+-+-+-+-+-+-+-+-+-+-+-+-+-+-+-+-+-+-+
|                        SID/Label (variable)                   |
+-+-+-+-+-+-+-+-+-+-+-+-+-+-+-+-+-+-+-+-+-+-+-+-+-+-+-+-+-+-+-+-+
```

FIG. 64

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|              Type             |             Length            |
+-+-+-+-+-+-+-+-+-+-+-+-+-+-+-+-+-+-+-+-+-+-+-+-+-+-+-+-+-+-+-+-+
|     Flags     |     Weight    |            Reserved           |
+-+-+-+-+-+-+-+-+-+-+-+-+-+-+-+-+-+-+-+-+-+-+-+-+-+-+-+-+-+-+-+-+
|                     SID/Label/Index (variable)                |
+-+-+-+-+-+-+-+-+-+-+-+-+-+-+-+-+-+-+-+-+-+-+-+-+-+-+-+-+-+-+-+-+
```

FIG. 65

```
                                                                    6800
                                                                 ↙
    0                   1                   2                   3
    0 1 2 3 4 5 6 7 8 9 0 1 2 3 4 5 6 7 8 9 0 1 2 3 4 5 6 7 8 9 0 1
   +-+-+-+-+-+-+-+-+-+-+-+-+-+-+-+-+-+-+-+-+-+-+-+-+-+-+-+-+-+-+-+-+
   |         Type          |             Length                    |
   +-+-+-+-+-+-+-+-+-+-+-+-+-+-+-+-+-+-+-+-+-+-+-+-+-+-+-+-+-+-+-+-+
   |    Flags      |    Weight     |           Reserved            |
   +-+-+-+-+-+-+-+-+-+-+-+-+-+-+-+-+-+-+-+-+-+-+-+-+-+-+-+-+-+-+-+-+
   |                       Label Space ID                          |
   +---------------------------------------------------------------+

|                    SID/Label/Index (variable)                 |
   +---------------------------------------------------------------+
```

FIG. 68

```
                                                                    6900
                                                                 ↙
    0                   1                   2                   3
    0 1 2 3 4 5 6 7 8 9 0 1 2 3 4 5 6 7 8 9 0 1 2 3 4 5 6 7 8 9 0 1
   +-+-+-+-+-+-+-+-+-+-+-+-+-+-+-+-+-+-+-+-+-+-+-+-+-+-+-+-+-+-+-+-+
   |         Type          |             Length                    |
   +-+-+-+-+-+-+-+-+-+-+-+-+-+-+-+-+-+-+-+-+-+-+-+-+-+-+-+-+-+-+-+-+
   |    Flags      |    Weight     |           Reserved            |
   +-+-+-+-+-+-+-+-+-+-+-+-+-+-+-+-+-+-+-+-+-+-+-+-+-+-+-+-+-+-+-+-+

+-+-+-+-+-+-+-+-+-+-+-+-+-+-+-+-+-+-+-+-+-+-+-+-+-+-+-+-+-+-+-+-+
   |             OSPF Neighbor ID / IS-IS System-ID                |
   +                               +-+-+-+-+-+-+-+-+-+-+-+-+-+-+-+-+
   |                               |
   +-+-+-+-+-+-+-+-+-+-+-+-+-+-+-+-+

+-+-+-+-+-+-+-+-+-+-+-+-+-+-+-+-+-+-+-+-+-+-+-+-+-+-+-+-+-+-+-+-+
   |                       Label Space ID                          |
   +-+-+-+-+-+-+-+-+-+-+-+-+-+-+-+-+-+-+-+-+-+-+-+-+-+-+-+-+-+-+-+-+
   |                    SID/Label/Index (variable)                 |
   +---------------------------------------------------------------+
```

FIG. 69

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|             Type              |            Length             |
+-+-+-+-+-+-+-+-+-+-+-+-+-+-+-+-+-+-+-+-+-+-+-+-+-+-+-+-+-+-+-+-+
|     Flags     |   Algorithm   |           Reserved            |
+-+-+-+-+-+-+-+-+-+-+-+-+-+-+-+-+-+-+-+-+-+-+-+-+-+-+-+-+-+-+-+-+
|                    SID/Index/Label (variable)                 |
+-+-+-+-+-+-+-+-+-+-+-+-+-+-+-+-+-+-+-+-+-+-+-+-+-+-+-+-+-+-+-+-+
```

FIG. 70

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|             Type              |            Length             |
+-+-+-+-+-+-+-+-+-+-+-+-+-+-+-+-+-+-+-+-+-+-+-+-+-+-+-+-+-+-+-+-+
|     Flags     |   Algorithm   |           Reserved            |
+-+-+-+-+-+-+-+-+-+-+-+-+-+-+-+-+-+-+-+-+-+-+-+-+-+-+-+-+-+-+-+-+
|                         Label Space ID                        |
+-+-+-+-+-+-+-+-+-+-+-+-+-+-+-+-+-+-+-+-+-+-+-+-+-+-+-+-+-+-+-+-+
|                    SID/Index/Label (variable)                 |
+-+-+-+-+-+-+-+-+-+-+-+-+-+-+-+-+-+-+-+-+-+-+-+-+-+-+-+-+-+-+-+-+
```

FIG. 71

MULTIPLE LABEL SPACES IN A LABEL SWITCHED ROUTER

BACKGROUND

Multiprotocol label switching (MPLS) is used to route data between nodes of a network based on labels instead of network addresses, thereby avoiding complex address lookups in a routing table. The labels identify virtual links (or paths) between nodes rather than endpoints. A path begins at a label edge router (LER) that is an ingress router for the path and traverses one or more label switched routers (LSRs) before ending at an LER that is an egress router for the path. The ingress router prefixes a packet with a label stack including one or more labels that indicate next hops along the path, e.g., the ingress router pushes the label stack onto the packet. Packets in the same forwarding equivalence class (FEC) are bound to the same label and are forwarded along the same path. In response to receiving a packet, an LSR uses the label value in the topmost entry of the label stack to determine the next hop for the packet, e.g., using a lookup table. The LSR then performs operations on the label stack based on the information in the topmost entry. For example, the LSR can swap the topmost label with a new label. For another example, the LSR can push a new label on top of the existing label to encapsulate the packet in another layer of MPLS. For yet another example, the LSR can pop the topmost label from the packet, which may reveal another label entry in the label stack. If the popped label is the last label on the label stack, the packet exits the MPLS tunnel, e.g., at an egress router. Otherwise, the LSR forwards the packet to the next hop router.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

FIG. 3 is a block diagram of a communication system that includes routers that implement a per-platform downstream-assigned label space according to some embodiments.

FIG. 5 illustrates an MPLS header according to some embodiments.

FIG. 7 is a block diagram of label spaces and forwarding plane incoming label map (ILM) tables that are identified by different label space identifiers according to some embodiments.

FIG. 8 is a vectored label stack (VLS) according to some embodiments.

FIG. 9 is an encoding of a variable-sized VLS according to some embodiments.

FIG. 22 is a multi-label space capability type-length-value (TLV) in label distribution protocol (LDP) according to some embodiments.

FIG. 23 is a multi-space label TLV in LDP according to some embodiments.

FIG. 24 is a label object in RSVP-TE according to some embodiments

FIG. 25 is a multi-space label object in RSVP-TE according to some embodiments.

FIG. 28 is a prefix segment identifier (SID) in IS-IS according to some embodiments.

FIG. 29 illustrates the 1-octet flags in prefix SID in IS-IS according to some embodiments.

FIG. 32 illustrates the 1-octet flags field in adjacency SID in IS-IS according to some embodiments.

FIG. 33 is a multi-space adjacency SID in IS-IS according to some embodiments.

FIG. 34 is an SR-Capabilities sub-TLV in IS-IS according to some embodiments.

FIG. 35 illustrates the 1-octet of flags field in SR-Capabilities TLV in IS-IS according to some embodiments.

FIG. 36 is an SID/label sub-TLV in IS-IS according to some embodiments.

FIG. 37 is a multi-space SID/label sub-TLV in IS-IS according to some embodiments.

FIG. 38 is an SID-Label Binding TLV in IS-IS according to some embodiments.

FIG. 39 is a prefix-SID in OSPF according to some embodiments.

FIG. 40 illustrates the 1-octet flags field in prefix-SID in OSPF according to some embodiments.

FIG. 41 is a prefix-SID in OSPF when M-Flag is set in the 1-octet flags field in the prefix-SID in OSPF according to some embodiments.

FIG. 42 is an adjacency SID in OSPF according to some embodiments.

FIG. 43 is a local area network (LAN) adjacency SID in OSPF according to some embodiments.

FIG. 44 illustrates the 1-octet flags field in LAN adjacency SID in OSPF according to some embodiments.

FIG. 45 is an adjacency SID in OSPF when the M-flag in the 1-octet flags field in adjacency SID in OSPF is set according to some embodiments.

FIG. 48 is an SID/Label sub-TLV in OSPF according to some embodiments.

FIG. 49 is a multi-space SID/Label sub-TLV in OSPF according to some embodiments.

FIG. 52 illustrates the 1-octet flags field in prefix-SID in OSPFv3 according to some embodiments.

FIG. 53 is a prefix-SID in OSPFv3 when the M-flag in the 1-octets flags field in prefix-SID in OSPFv3 is set according to some embodiments.

FIG. 54 is an adjacency SID in OSPFv3 according to some embodiments.

FIG. 55 is a LAN adjacency SID in OSPFv3 according to some embodiments.

FIG. 62 illustrates the 1-octet flags field in SR Capabilities TLV in BGP-LS according to some embodiments.

FIG. 63 is an SID/Label Sub-TLV in BGP-LS according to some embodiments.

FIG. 64 is a multi-space SID/Label Sub-TLV in BGP-LS according to some embodiments.

FIG. 65 is an adjacency SID in BGP-LS according to some embodiments.

FIG. 68 is an adjacency SID in BGP-LS when the M-flag in 1-octet flags field in the adjacency SID in BGP-LS is set according to some embodiments.

FIG. 69 is a LAN adjacency SID in BGP-LS when the M-flag in 1-octet flags field in the LAN adjacency SID in BGP-LS is set according to some embodiments.

FIG. 70 is a prefix SID TLV in BGP-LS according to some embodiments.

FIG. 71 is a prefix SID TLV in BGP-LS when the M-bit is set in the 1-octet flags field in the prefix SID TLV in BGP-LS according to some embodiments.

DETAILED DESCRIPTION

Many chipsets used to implement a conventional label switched router (LSR) assume that entries in the label stack include a predetermined number of bits. The forwarding plane of the routers are usually implemented with off-the-shelf network processors or application-specific integrated circuits (ASICs), which are hardcoded with dedicated circuits and instructions that only parse standard multiprotocol label switching (MPLS) labels. Furthermore, instructions that are used to perform table lookups are implemented using hardware that assumes that labels include a fixed and predetermined number of bits. A conventional 32-bit entry in an MPLS label stack includes a 20-bit label value, a 3-bit traffic class field (known as EXP) that indicates quality of service (QoS) priority and congestion, a 1-bit bottom of stack flag bit that, if set, indicates that the current label is the last label in the stack, and an 8-bit time-to-live (TTL) field. The hardware in conventional LSRs is therefore constructed to implement instructions that utilize 32-bit entries in an MPLS label stack. Consequently, the size of the label space that is addressable using the conventional 32-bit entry is limited to the ~1M labels defined by the 20-bit label value.

High density MPLS-based applications can easily exhaust a label space that is limited to ~1M labels. For example, virtual private network (VPN) service applications often support more than 1M VPNs and so the provider edge (PE) routers that route the VPN traffic require more than the ~1M labels available in the conventional label space. One approach to supporting such high-density MPLS-based applications is to increase the number of bits in the entries of the label stack to accommodate label values larger than 1M. However, this approach cannot be used in existing chipsets that assume 32-bit entries in the MPLS label stack and would require redesigning chipsets used to implement future LSRs to support instructions that use a different (or variable) number of bits to represent the MPLS labels.

Figure 1:
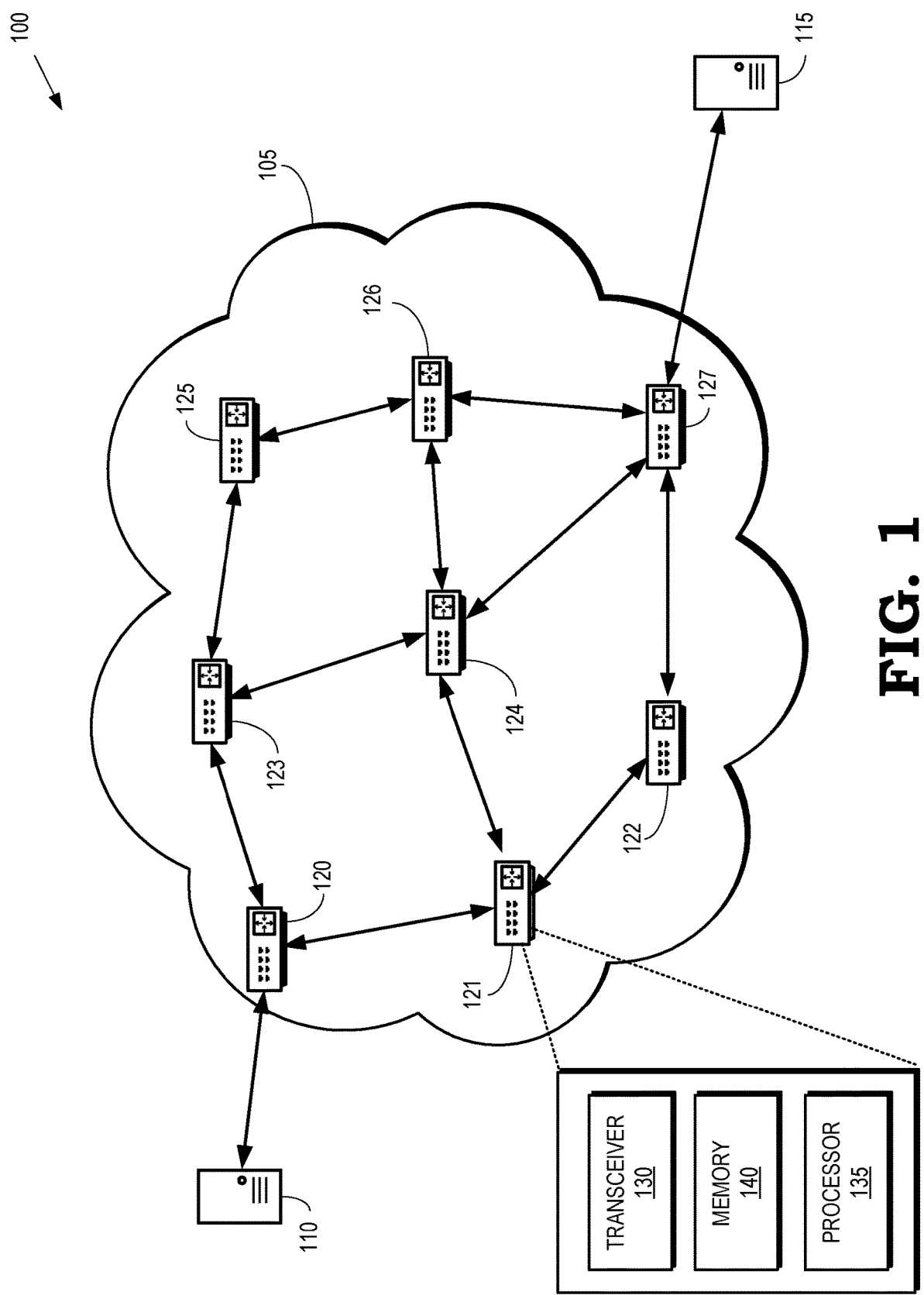
FIG. 1 is a block diagram of the communication system that supports multiple label spaces in label switched routers (LSRs) according to some embodiments.
Figure 72:
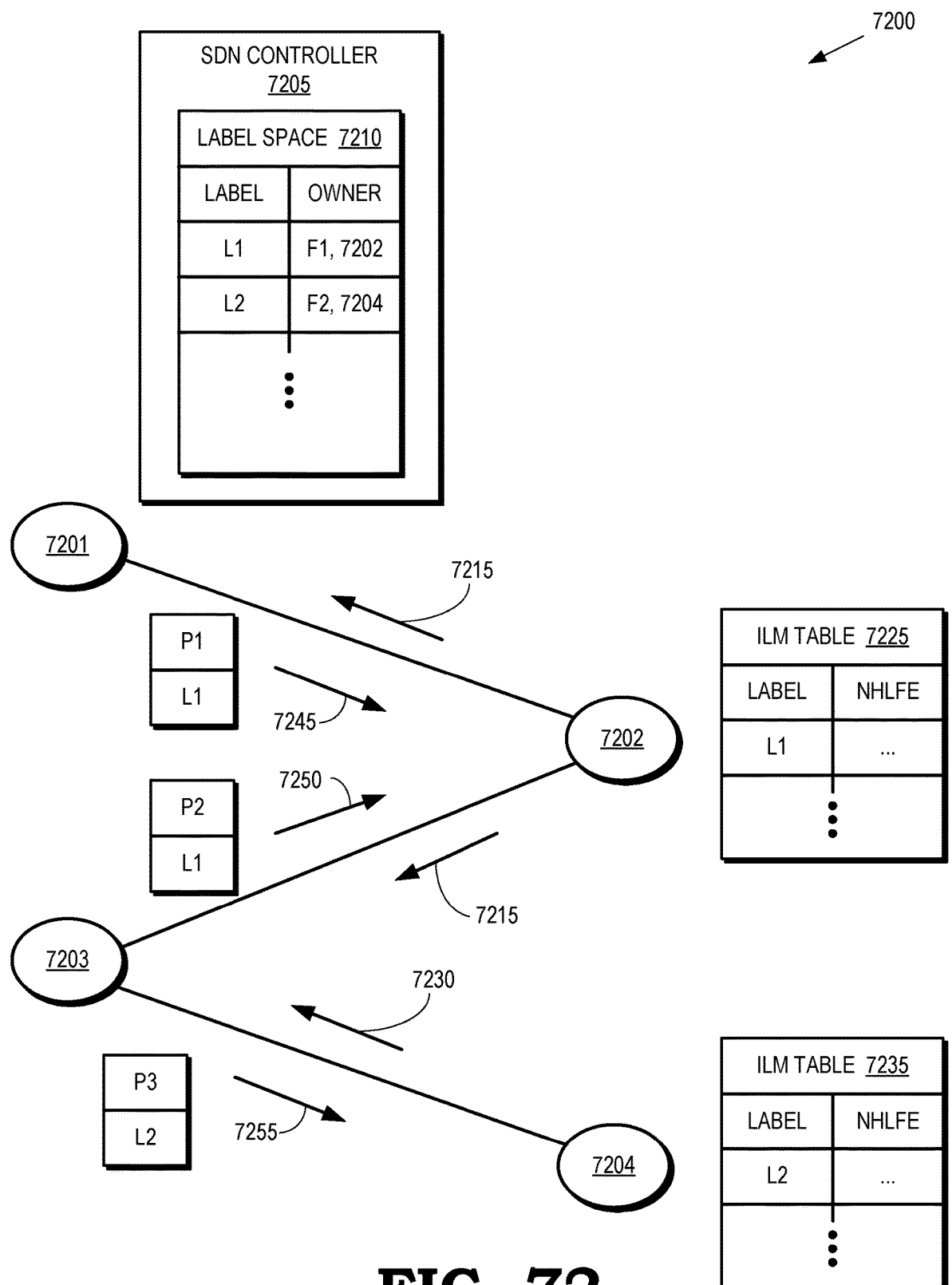
FIG. 72 is a block diagram of a communication system that includes routers that implement a global label space according to some embodiments.

FIGS. 1-72 disclose techniques for allocating different label space identifiers to multiple label spaces for each label space type that is stored in a router in a communication system. Implementing multiple label space identifiers per label space type increases the number of labels available to routers by orders of magnitude, while preserving the standard MPLS label format. Each of the multiple label spaces includes a number of entries corresponding to a predetermined number of bits such as the ~1M labels for the 32-bit entries in an MPLS label stack. Within each label space, the labels are mapped to forwarding equivalency classes (FECs) and the mappings are associated with the label space identifiers for the label spaces. The mappings are distributed to the routers in the communication system using upstream or downstream assignment techniques. In some embodiments, the label spaces are per-platform label spaces or global label spaces. The forwarding planes of the routers maintain incoming label map (ILM) tables for a label space type associated with (and tagged with) corresponding label space identifiers. The ILM tables are programmed using the label-to-FEC mapping for the corresponding label space identifiers. Packets in an FEC are encoded with a tuple (referred to herein as a vectored label stack, VLS) that includes a label space identifier that indicates one of a set of label spaces and a label for an entry in the label space indicated by the label space identifier.

In some embodiments, the label space type associated with the VLS is determined using the same techniques that are used to determine the label space type of a received MPLS label. For example, if the VLS/MPLS packet is received on an interface and that interface supports per-interface label space, then the packet must be mapped onto the per-interface label space (i.e., label is looked up in ILM Tables in per-interface label space), unless explicitly specified in the packet. So, per-interface label space and per-platform label space are mutually exclusive. If the VLS/MPLS packet is encoded from global label space then the VLS/MPLS label must be prepended with a special GLI (Global Label Indicator) that indicates the VLS/MPLS label must be looked up in Global Label Space. If the VLS/MPLS packet is received atop a multicast tunnel, then it is implicit that the VLS/MPLS label must belong to upstream label space. Thus, the same label can indicate different entries in the different label spaces. In response to receiving an encoded packet, the receiving router identifies the label and the label space identifier based on the VLS. The label space identifier is used to identify the corresponding ILM table and the label identifies an entry in the ILM Table that includes forwarding information such as the next hop along the path associated with the label. The receiving router forwards the packet using the information in the entry of the ILM Table and, in some cases, pushes another VLS onto the packet before forwarding.

FIG. 1 is a block diagram of a communication system 100 that supports multiple label spaces in label switched routers (LSRs) according to some embodiments. The communication system 100 includes a network 105 that provides communication pathways between a server 110 and a server 115. However, some embodiments of the network 105 provide communication pathways between other entities or users including desktop computers, laptop computers, tablet computers, smart phones, Internet of Things (IoT) devices, and the like. The communication system 100 includes a set of routers 120, 121, 122, 123, 124, 125, 126, 127, which are collectively referred to herein as "the routers 120-127." In the illustrated embodiment, the routers 120-127 are implemented as LSRs.

The routers 120-127 include router memories to store a plurality of label spaces for each label space type used in the communication system 100. The plurality of label spaces store labels that identify virtual links between nodes of the communication system 100 such as the server 110, the server 115, and the routers 120-127. The routers 120-127 also include processors to allocate a plurality of label space identifiers to the plurality of label spaces and to route packets based on labels and label space identifiers included in the packets. The routers 120-127 also include transceivers to transmit or receive the packets including the labels and the label space identifiers. Some embodiments of the routers 120-127 use multiprotocol label switching (MPLS) to assign labels to identify packets belonging to forwarding equivalence classes (FECs). Criteria that are used to define an FEC include a transport label switched path (LSP) between two of the routers 120-127, Internet protocol (IP) packets with destination addresses matching an IP prefix, a pseudo-wire, a Layer 2 virtual private network (VPN), a Layer 3 VPN, and the like. In some cases, an FEC is defined based on a network element such as an adjacency between two of the routers 120-127, a loopback address in one of the routers 120-127 that identifies the router that includes the loopback address, a network segment such as an IGP area, an Autonomous System, and the like.

Each of the routers 120-127 determines whether to map a label to a corresponding FEC. Depending on the type of the label (i.e type of its parent label space), e.g., downstream-assigned or upstream-assigned, the routers 120-127 distribute the mapping to other routers 120-127 using distribution protocol such as LDP, RSVP-TE, MultiProtocol extensions for BGP (MP-BGP), OSPF, OSPFv3, IS-IS, BGP-LS, and the like.

In response to receiving the mapping information, the routers 120-127 program incoming label map (ILM) tables in the forwarding plane. The label is used as an index into the ILM tables. The ILM entry for the label points to a next hop label forwarding entry (NHLFE) that contains information used to forward packets including the label to the next hop. For example, the entry can include information indicating whether the router is a termination of the FEC or if the label included in the packet is to be swapped for a new label and the packet is to be forwarded with the label distributed by another one of the routers 120-127.

Some embodiments of the routers 120-127 include a transceiver that is used to receive and transmit packets, a memory to store information, and a processor to execute instructions. For example, the router 121 is implemented using a transceiver 130 for receiving and transmitting packets conveyed in the network 105. The router 121 also includes a processor 135 and a memory 140. The processor 135 executes instructions stored in the memory 140 and stores information in the memory 140 such as the results of the executed instructions.

Figure 2:
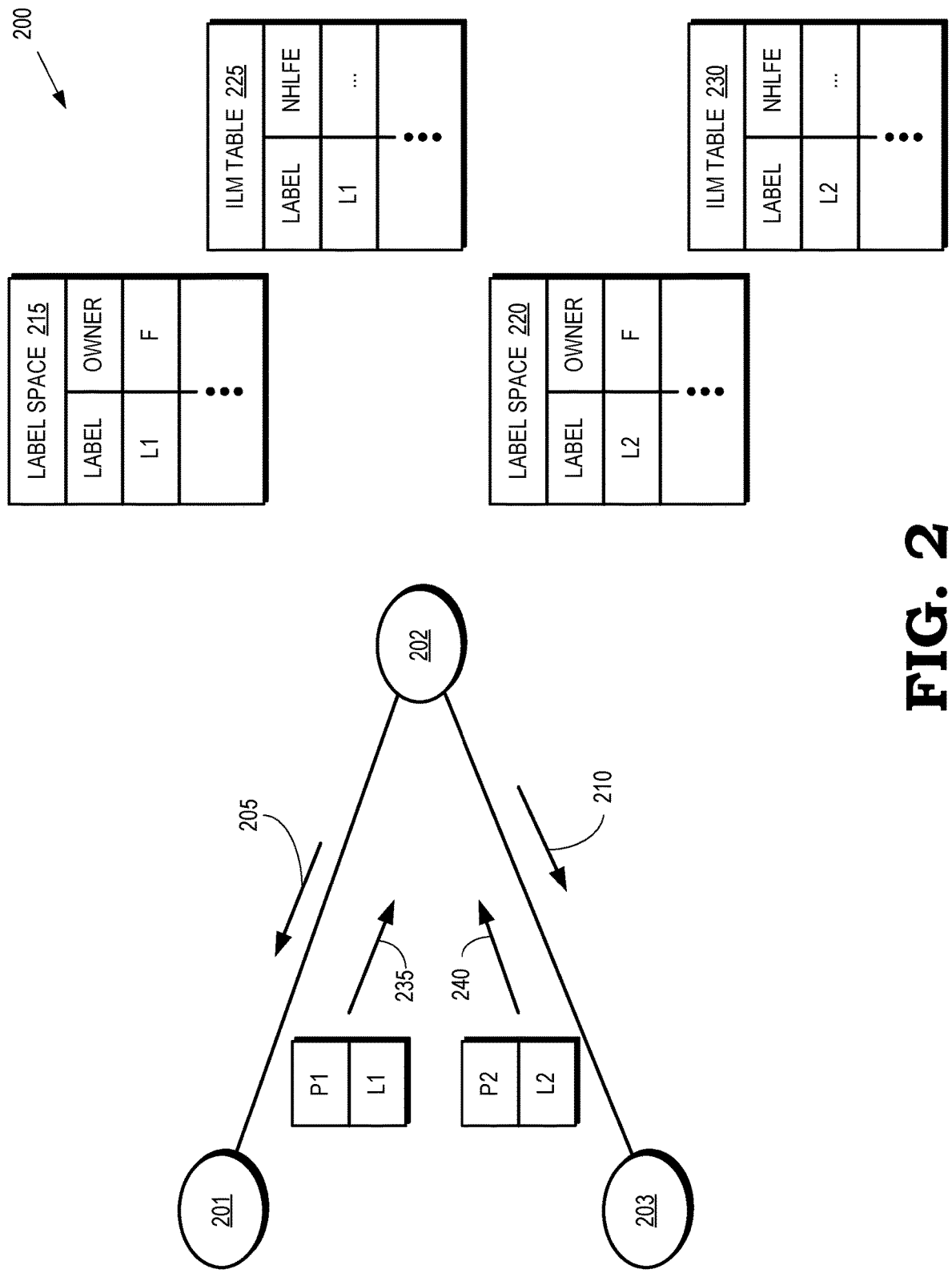
FIG. 2 is a block diagram of a communication system that includes routers that implement a per-interface downstream-assigned label space according to some embodiments.

FIG. 2 is a block diagram of a communication system 200 that includes routers that implement a downstream-assigned per-interface label space according to some embodiments. The labels in the per-interface label space are only unique per interface. The communication system 200 includes LSR 201, 202, 203, which are collectively referred to herein as "the LSR 201-203."

In the illustrated embodiment, the LSR 202 provides a first label mapping 205 to the upstream LSR 201 and a second label mapping 210 to the upstream LSR 203. The first label mapping 205 indicates an FEC F, a per-interface label L1, where label L1 is allocated by LSR 202 from its per-interface label space on the interface X between LSR 202 and the LSR 201. The second label mapping 210 indicates the FEC F, a different per-interface label L2, where label L2 is allocated by LSR 202 from its per-interface label space on the interface Y between the LSR 202 and the LSR 203. The first label mapping 205 and the second label mapping 210 are used to program a first label space 215 associated with the interface X, a second label space 220 associated with the interface Y, a first ILM table 225 associated with the interface X, and a second ILM table 230 associated with the interface Y.

In operation, the LSR 201 sends a packet P1 of FEC F to LSR 202 with Label L1, as indicated by the arrow 235. Since the MPLS packet P1 arrived on interface X, the LSR 202 looks up L1 in the ILM Table 225 of interface X and makes forwarding decision based on the NHLFE of the ILM entry indicated by the label L1. The LSR 203 sends a packet P2 of FEC F to the LSR 202 with Label L2, as indicated by the arrow 240. Since the MPLS packet P2 arrived on interface Y, the LSR 202 looks up L2 in the ILM Table 230 of interface Y and makes forwarding decision based on the NHLFE of the ILM entry in the ILM Table 230. Implementing a per-interface label space requires a guarantee that packets for FEC F arrive from LSR 201 only on interface X and from LSR 203 only on interface Y. Secondly, LSR 202 may additionally support other label space types such as per-platform label space etc. In that case, any MPLS packet arriving on the data link layer encapsulation on an interface that is configured with per-platform label space is looked up in the per-interface ILM table of that interface only. There is a very limited number of use cases that can guarantee this condition. Accordingly, per-interface label spaces are not typically followed in practice in state-of-the-art MPLS implementations.

FIG. 3 is a block diagram of a communication system 300 that includes routers that implement a per-platform downstream-assigned label space according to some embodiments. This is usually the default label space of an LSR as majority of the MPLS based applications use the per-platform label space. The communication system 300 includes LSR 301, 302, 303, which are collectively referred to herein as "the LSR 301-303." The scope of the downstream-assigned label space is the LSR 301-303 and each LSR 301-303 maintains one per-platform label space that is used for allocating labels for the associated FECs. In the illustrated embodiment, the LSR 302 provides a label mapping 305 to the upstream LSR 301 and the upstream LSR 303. The label mapping 305 indicates an FEC F and a label L. The label L is allocated for a FEC from a label space 310 and the label mapping is programmed in an ILM table 315.

In operation, the LSR 301 sends a packet P1 of FEC F to LSR 302 with Label L, as indicated by the arrow 320. The LSR 302 looks up L in the ILM Table 315 and makes a forwarding decision based on the NHLFE of the ILM entry indicated by the label L. The LSR 303 sends a packet P2 of FEC F to the LSR 302 with Label L, as indicated by the arrow 325. The LSR 302 looks up L in the ILM Table 315 and makes a forwarding decision based on the NHLFE of the ILM entry in the ILM Table 315. Note that per-platform label spaces and per-interface label spaces are mutually exclusive for MPLS packets received on the data link layer encapsulation on an interface. If an interface is configured with per-interface label space, then an MPLS packet received on the data link layer encapsulation on that interface is looked up in the ILM Table on that interface only, not in the ILM Table 315. The ILM Table 315 is looked up for an MPLS packet when per-interface label space is not configured on the receiving interface, or the MPLS packet is encapsulated by a second MPLS label wherein the LSR 302 is the termination of the LSP indicated by the second MPLS label.

Figure 4:
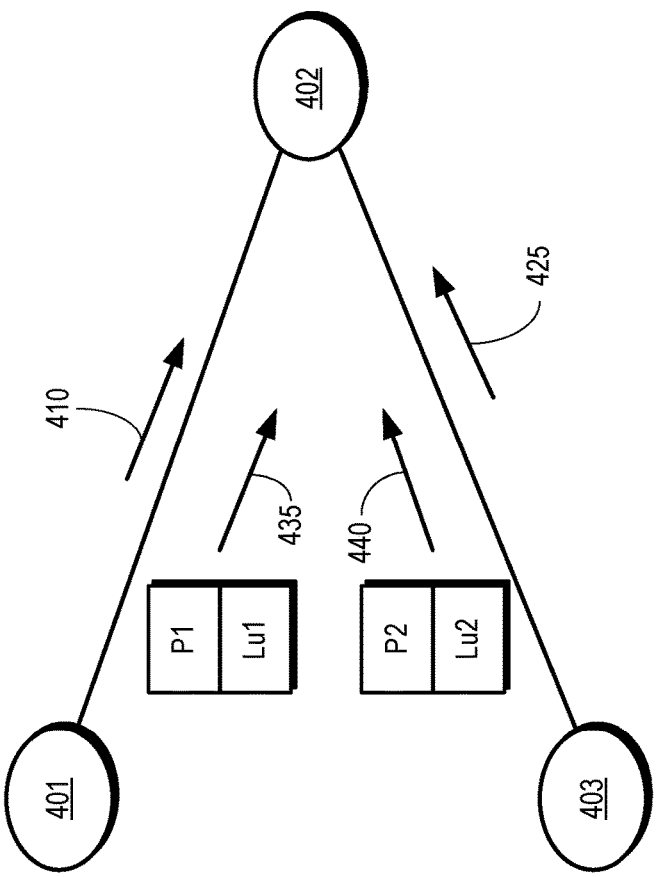
FIG. 4 is a block diagram of a communication system that includes routers that implement a per-platform upstream-assigned label space according to some embodiments.

FIG. 4 is a block diagram of a communication system 400 that includes routers that implement a per-platform upstream-assigned label space according to some embodiments. The communication system 400 includes LSR 401, 402, 403, which are collectively referred to herein as "the LSR 401-403." In the illustrated embodiment, the LSR 401 allocates a label Lu1 for the FEC F from a corresponding upstream assigned label space 405 and distributes the label Lu1 to downstream routers including the downstream LSR 402, as indicated by the arrow 410. The downstream LSR 402 programs a corresponding upstream ILM table 415 specific to the upstream LSR 401 using the information received from the upstream LSR 401. The LSR 403 allocates a label Lu2 from a corresponding upstream-assigned label space 420 and distributes the label Lu2 to downstream routers including the upstream LSR 402, as indicated by the arrow 425. The downstream LSR 402 programs a corresponding upstream ILM table 430 using the information received from the upstream LSR 403.

In operation, LSR 401 sends a packet P1 of FEC F to LSR 402 with Label Lu1, as indicated by the arrow 435. In response to receiving the MPLS packet 435, the LSR 402 determines that the MPLS packet is coming from the LSR 401. Typically, an MPLS packet with upstream assigned label is encapsulated by a second MPLS label such that LSR 402 is the termination of the LSP indicated by the second MPLS label wherein the LSP indicates the its source, i.e LSR 401. There could be other means by which a determination may be made by LSR 402 that the MPLS packet is coming from LSR 401.

The LSR 402 looks up Lu1 in the Upstream ILM Table 415 and makes forwarding decision based on the NHLFE of the ILM entry. The LSR 403 sends a packet P2 to the LSR 402 with Label Lu2, as indicated by the arrow 440. In response to receiving the MPLS packet 440, the LSR 402 determines that the MPLS packet 440 is coming from the LSR 403. The LSR 402 looks up Lu2 in the Upstream ILM Table 430 and makes forwarding decision based on the NHLFE of the ILM entry.

FIG. 5 illustrates a conventional MPLS header 500 according to some embodiments. The MPLS header 500 includes a 20-bit label value, a 3-bit traffic class field (EXP) that indicates quality of service (QoS) priority and congestion, a 1-bit bottom of stack flag bit that, if set, indicates that the current label is the last label in the stack, and a 8-bit time-to-live (TTL) field. As discussed herein, the 20 bits used to represent the label value limit the number of available labels to ~1M, which is easily exhausted by many current applications.

Figure 6:
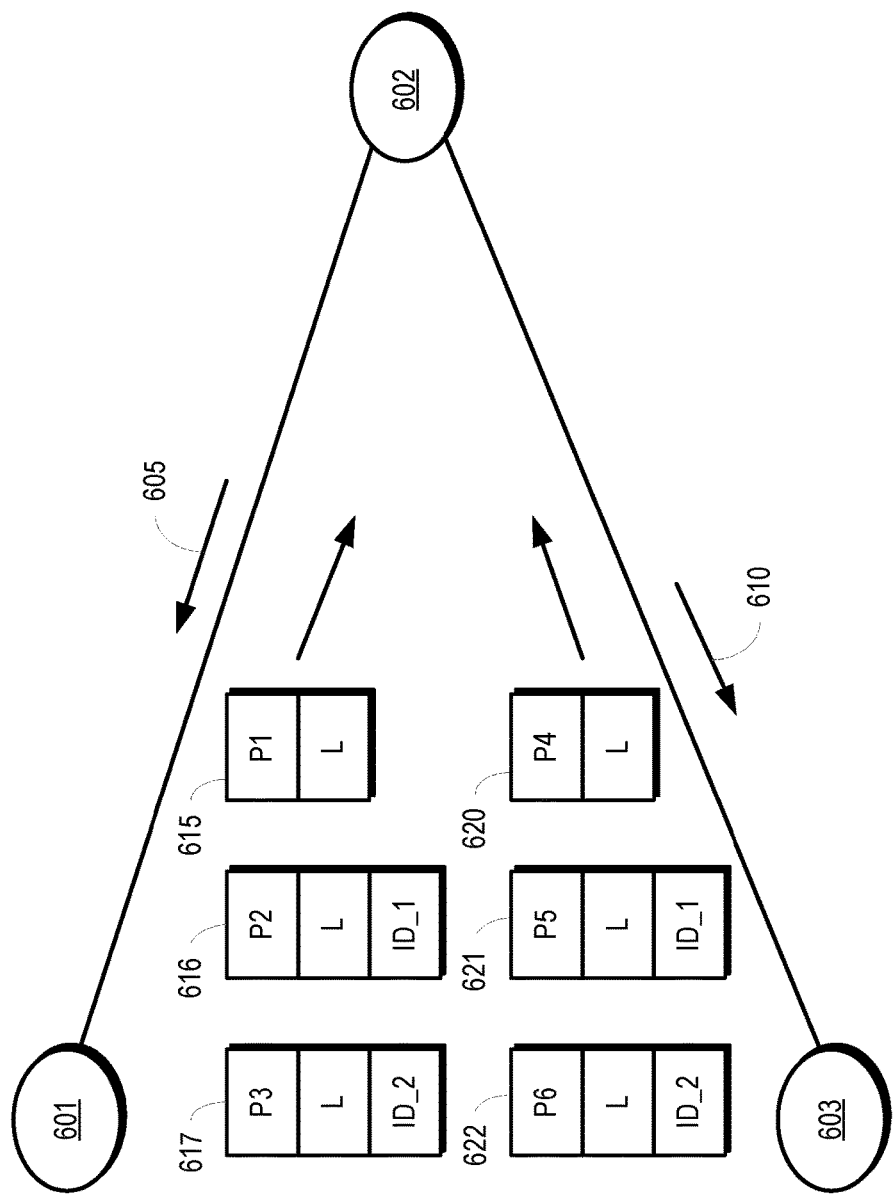
FIG. 6 is a block diagram of a communication system that includes routers that implement multiple per-platform label spaces per label space type according to some embodiments.

FIG. 6 is a block diagram of a communication system 600 that includes routers that implement multiple per-platform label spaces according to some embodiments. The communication system 600 is used to implement some embodiments of the communication system 100 shown in FIG. 1 and includes LSR 601, 602, 603, which are collectively referred to herein as "the LSR 601-603." In the illustrated embodiment, the LSR 601-603 implement downstream assignment of labels from the multiple per-platform label spaces. However, other types of label spaces are implemented in other embodiments such as upstream-assigned label spaces, global label spaces, and the like.

The LSR 601-603 support N different per-platform label spaces that are assigned label space identifiers in a range from 0 to N−1. In the illustrated embodiment, the LSR 602 assigns labels in different label spaces to different FECs, as indicated by the arrows 605, 610. For example, the LSR 602 allocates the following labels and sends the corresponding label mappings to the upstream LSRs 601, 603:

Label L for FEC F1 from label space with Label Space ID 0.

Label L for FEC F2 from label space with Label Space ID 1.

Label L for FEC F3 from label space with Label Space ID 2.

In the illustrated embodiment, the same label L is allocated from each label space to highlight the fact that although label values are same, they are disjoint. For example, the tuple {Label L, Label Space ID 0} represents a different label for a different FEC than the tuple {Label L, Label Space ID 1}.

FIG. 7 is a block diagram of label spaces 700 and forwarding plane incoming label map (ILM) tables 705 that are identified by different label space identifiers according to some embodiments. The label spaces 700 and the ILM tables 705 are implemented in some embodiments of the LSR 602 shown in FIG. 6. The label spaces 700 include a first label space 715 that is associated with a label space identifier (ID 0), a second label space 720 that is associated with a label space identifier (ID 1), a third label space 725 that is associated with a label space identifier (ID 2), and other label spaces including the label space 730 that is associated with the label space identifier (ID N−1). The ILM tables 705 and the forwarding plane of the router include a first ILM table 735 that is associated with a label space identifier (ID 0), a second ILM table 740 that is associated with a label space identifier (ID 1), a third ILM table 745 that is associated with a label space identifier (ID 2), and other ILM tables including the ILM table 750 that is associated with the label space identifier (ID N−1).

In operation, the LSR 601, 603 send packets to the LSR 602 that are encoded using tuples (or vectored label spaces, VLS) that include a label space identifier and a label associated with the FEC of the packet. The following are examples of encodings of packets transmitted by the LSR 601, 603 to the LSR 602:

The LSR 601 sends packet P1 for FEC F1 with MPLS label L, as indicated by 615. Since Label Space ID in the mapping was 0, the LSR 601 avoided encoding the tuple including the label space identifier in order to save an extra label. When the packet 615 arrives at LSR 602, it looks up the label L in the ILM Table 735 associated with Label Space ID 0 to make a forwarding decision. So, the receiving LSR always looks up a label in Label Space ID 0, unless the label is included in VLS. This technique also offers backward compatibility with state-of-the-art implementations. For example, let's assume LSR 601 is a state-of-the-art LSR wherein LSR 602 supports multiple label spaces. In that case while distributing any label mapping to LSR 601. LSR 602 will always allocate label from the label space with Label Space ID 0.

The LSR 601 sends packet P2 for FEC F2 with VLS={Label Space ID=1, label=L}, as indicated by 616. When the packet 616 arrives at the LSR 602, it looks up the label L in the ILM Table 740 associated with Label Space ID 1 to make a forwarding decision.

The LSR 601 sends packet P3 for FEC F3 with VLS={Label Space ID 2, label=L}, as indicated by 617. When the packet 617 arrives at the LSR 602, it looks up the label L in the ILM Table 745 associated with Label Space ID 2 to make a forwarding decision.

The LSR 603 sends packet P4 for FEC F1 with MPLS label L, as indicated by 620. Since Label Space ID in the mapping was 0, the LSR 603 avoided encoding VLS in order to save extra label. When the packet 620 arrives at the LSR 602, it looks up the label L in the ILM Table 735 associated with Label Space ID 0 to make a forwarding decision.

The LSR 603 sends packet P5 for FEC F2 with VLS={Label Space ID=1, label=L}, as indicated by 621. When the packet 621 arrives at the LSR 602, it looks up the label L in the ILM Table 740 associated with Label Space ID 1 to make a forwarding decision.

The LSR 603 sends packet P6 for FEC F3 with VLS {Label Space ID=2, label=L}, as indicated by 622. When the packet 621 arrives at the LSR 602, it looks up the label L in the ILM Table 745 associated with Label Space ID 2 to make a forwarding decision.

In some embodiments, the default label space is segregated into "logical label spaces" using the label space identifiers discussed herein. For example, if the size of default per-platform label space in a LSR is 1M, the default label space is segregated into four logical label spaces, each of size 250K labels. The logical label spaces are assigned Label Space IDs 0 to 3 respectively. The forwarding plane maintains only one and the default ILM Table of size 1M. Then the LSR can distribute a label L from the default label space. The label mapping is sent with {Label Space ID=L/250K, Label=L modulo 250K}. If an MPLS packet is received by the LSR with VLS={Label Space ID=S, label=Ln} then it looks up the label (S×250K+Ln) in default ILM Table.

In some embodiments, the Label Space ID is represented as the higher order bits of a label value from a default label space of size larger than 1M. In that case, the VLS encodes (Label Space ID=Higher Order_20_bits_of_Label, label=Lower_order_20_bits_of_Label) of a 40-bit label value.

FIG. 8 is a vectored label stack (VLS) 800 according to some embodiments. The VLS 800 is implemented in some embodiments of the communication system 100 shown in FIG. 1 and the communication system 600 shown in FIG. 6. The fields in the VLS 800 are defined as follows:

VLS-I: When VLS is embedded within an MPLS Label Stack, a receiving router distinguishes unambiguously between other MPLS labels and the VLS. To accomplish this, the first label in a VLS is a "Vectored Label Stack Indicator (VLS-I)", where preceding means closer to the top of the label stack (farther from bottom of stack indication). The VLS-I is a special label that is not used for any other purposes. In some embodiments, a value of VLS-I is reserved at IANA registry on Special-purpose label. The fields EXP and TTL in VLS-I are set to 0 as those fields have no significance. The S bit is set to 0 since other labels follow the VLS-I.

Label Space ID: This label encodes the identifier of a label space. The S-bit, EXP and TTL fields are set to 0.

Label: This identifies the MPLS label that belongs to the label space indicated by Label Space ID. The EXP and TTL fields are set to values as required by the application/FEC associated with the label. The S-bit is set accordingly to whether other MPLS labels follow after the VLS or not.

In some use cases, multiple labels belonging to the same label space are stacked together. In a MPLS hierarchy, multiple FECs are overlaid on one another. For example, an MPLS based VPN connection between an upstream Lsr to a directly connected downstream LSR, wherein VPN labels are exchanged between an upstream LSR and the downstream LSR. the VPN packets from the upstream Lsr to the downstream LSR are encapsulated by the VPN label distributed by the downstream LSR. The packet is further sent on a MPLS LSP tunnel from the upstream Lsr to the downstream LSR and the tunnel pushes a stack of two labels. If the VPN label and the two LSP labels are allocated by the downstream LSR from same label space, it is more optimal to encode the VLS as ={Label Space ID, VPN Label, LSP Label 1, LSP label 2}, wherein the 3 labels are summarized with the Label Space ID. In such use cases, an implementation may also employ an alternate encoding scheme as discussed below.

FIG. 9 is an encoding 900 of a variable-sized VLS according to some embodiments. The fields in the encoding 900 are defined as follows:

VVLS-I: The equivalent of VLS-I in FIG. 8.

The label following the VVLS-I is the Label Space ID.

The label following the Label Space ID is a special termed as the "VVLS Descriptor". The 20-bit label value field encodes the number of subsequent labels in the VVLS.

The label stack following the VVLS Descriptor includes P numbers of labels sharing the common Label Space ID at the receiver. The NumLabels field in VVLS descriptor is encoded with P.

Figure 10:
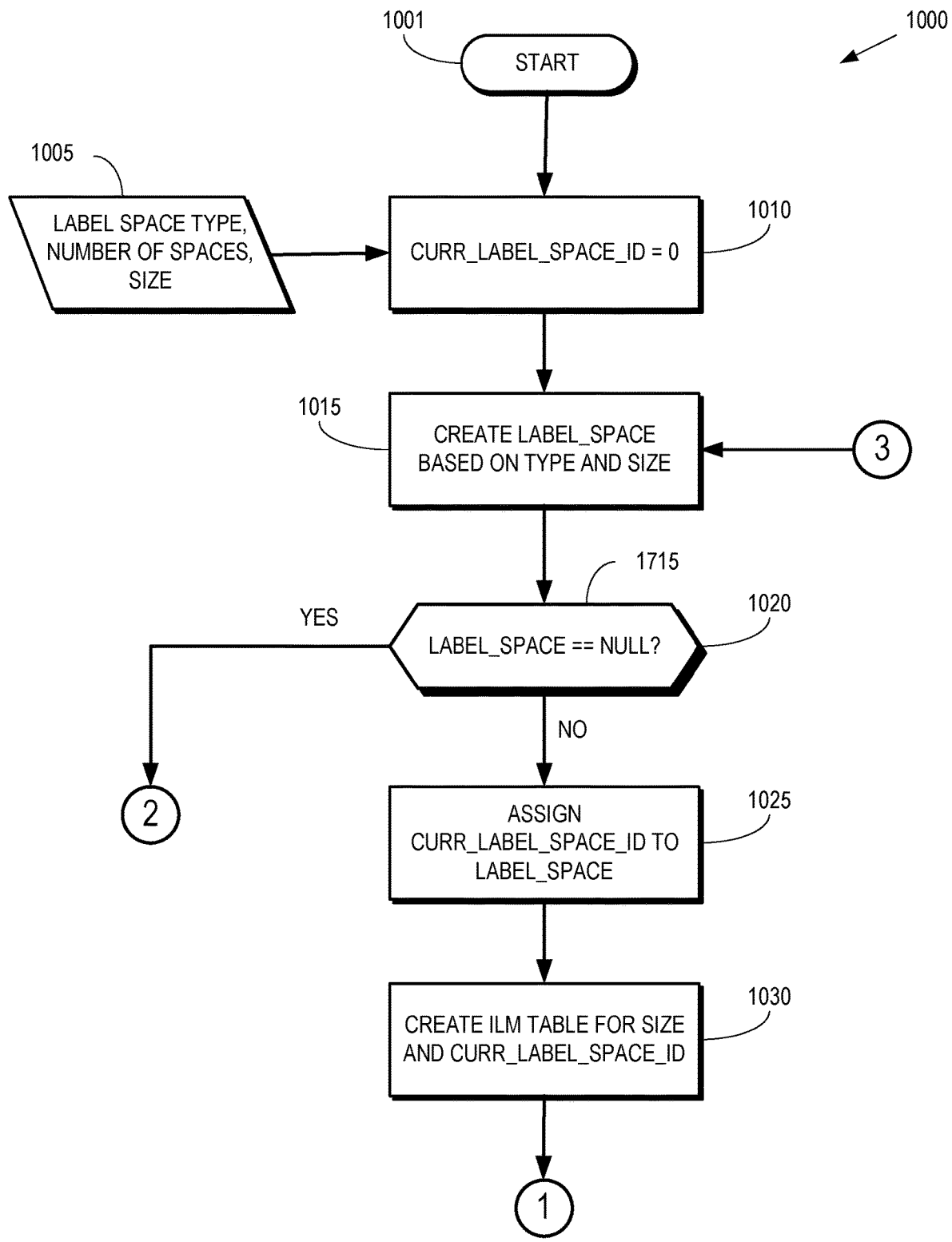
FIG. 10 is a flow diagram of a first portion of a method of configuring multiple label spaces according to some embodiments.

FIG. 10 is a flow diagram of a first portion of a method 1000 of configuring multiple label spaces according to some embodiments. The method 1000 is implemented in some embodiments of the communication system 100 shown in FIG. 1 and the communication system 600 shown in FIG. 6. In the illustrated embodiment, a router (such as an LSR) supports multiple label spaces of a specific label space type and configures a Label Space ID to each of the label spaces. The assignment of Label Space ID starts with value 0 and is then incremented by one for each subsequent label spaces. For example, if there are N label spaces then the Label Space ID range is [0 ... (N−1)] and is assigned to the label spaces. However, some embodiments choose alternate ways of assigning Label Space IDs, such as assigning only even numbers or assign random values.

The method 1000 begins at the block 1001. The input 1005 for the method includes a type of the label space, a number of label spaces, and a size of the label space. At block 1010, a value of the current label space identifier is set to zero or other predetermined initial value. The current label space identifier is a running variable to track the latest label space ID. At block 1015, the router creates a label space of the size and label space type specified by the input 1005.

At decision block 1020, the router determines whether the label space was successfully created. For example, the router determines whether the current value of the variable Label_Space is null. If the label space was not successfully created (e.g., the variable has a value of null), the method 1000 flows to the node 2. If the label space was successfully created (e.g., the variable has a value that is not equal to null), the method 1000 flows to block 1025.

At block 1025, the router assigns the value in the current label space identifier as the label space ID to the label space. At block 1030, the router creates an ILM Table in the forwarding plane that corresponds to the label space. The ILM Table is created with the label space identifier of the label space. The method 1000 then flows to the node 1.

Figure 11:
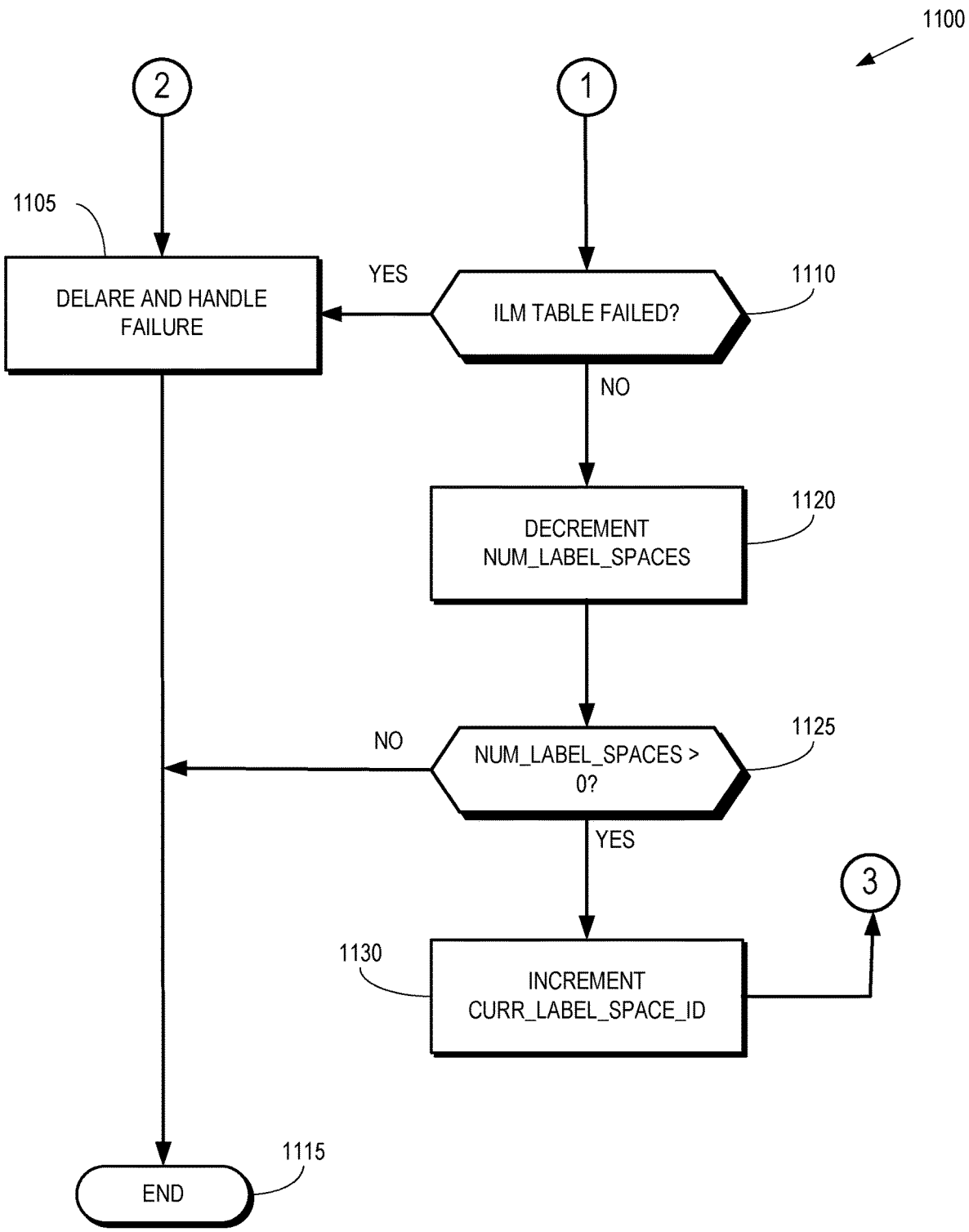
FIG. 11 is a flow diagram of a second portion of the method of configuring multiple label spaces according to some embodiments.

FIG. 11 is a flow diagram of a second portion of the method 1000 of configuring multiple label spaces according to some embodiments. The node 1 links the block 1030 in FIG. 10 to the block 1105. The node 2 links the decision block 1020 in FIG. 10 to the decision block 1110.

At block 1105, the router declares a failure to create the label space and handles the failure. For example, the router can perform cleanup of label spaces that were previously created before the failure. The method 1000 then flows to block 1115 and the method 1000 ends.

At decision block 1110, determines whether creation of the ILM table and the forwarding plane of the router succeeded or failed. If creation of the ILM Table failed, the method 1000 flows to block 1105. If creation of the ILM Table was successful, the method 1000 flows to block 1120 and the router decrements the input variable on the number of label spaces (which indicates the number of label spaces yet to be created).

At decision block 1125, the router determines whether the number of label spaces is greater than zero. If not, which indicates that there are no more label spaces to be created, the method 1000 flows to block 1115 and the method 1000 ends. If the number of label spaces is greater than zero, which indicates that more label spaces are to be created, the method 1000 flows to the block 1130. At the block 1130, the router increments the value of the current label space identifier by one and then the method 1000 flows to the node 3, which links to the block 1015 in FIG. 10.

Figure 12:
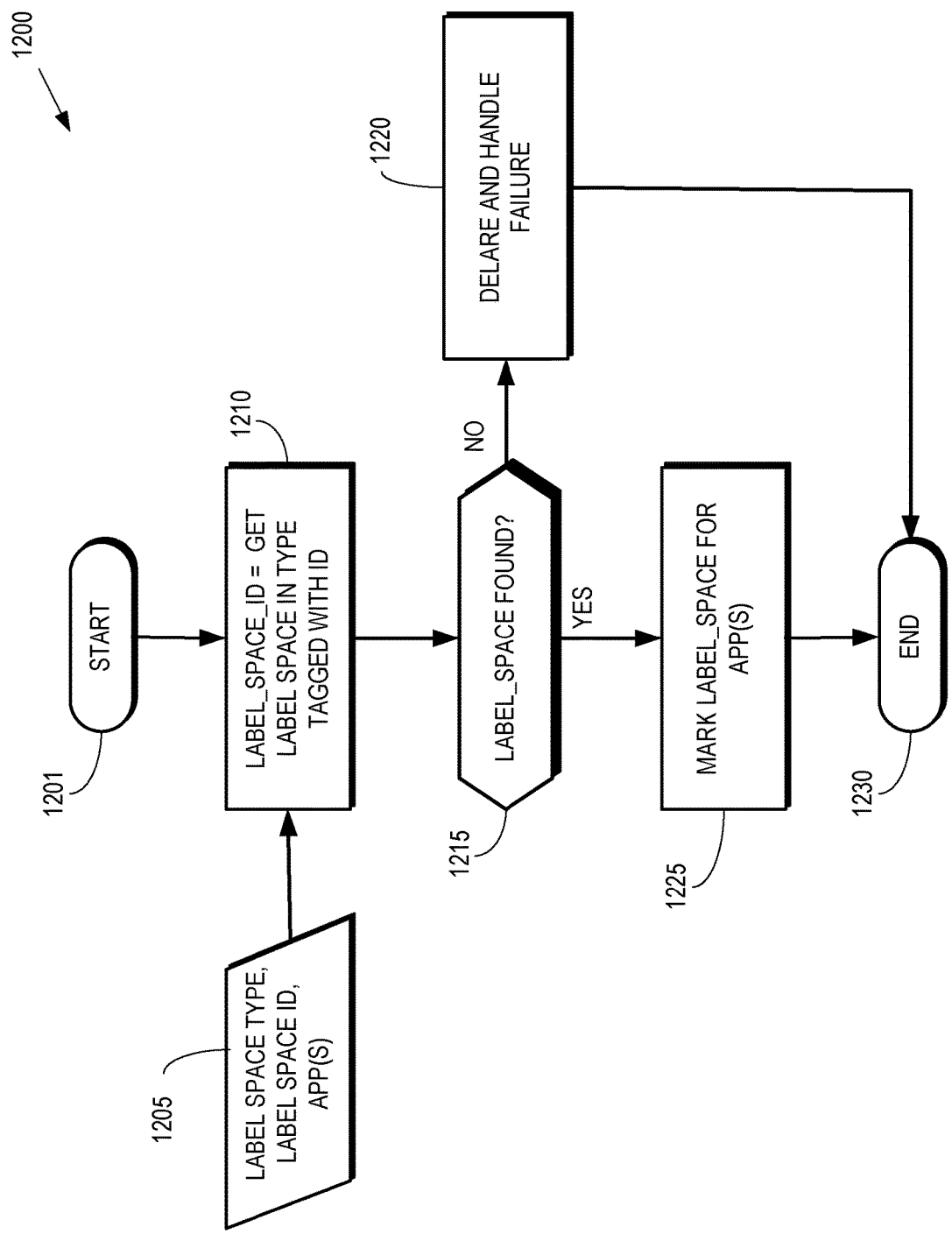
FIG. 12 is a flow diagram of a method of binding user applications to a label space according to some embodiments.

FIG. 12 is a flow diagram of a method 1200 of binding user applications to a label space according to some embodiments. The method 1200 is implemented in some embodiments of the communication system 100 shown in FIG. 1 and the communication system 600 shown in FIG. 6. Some embodiments of routers assigned label spaces within a label space type that are dedicated to one application or a certain group of applications. For example, within a per-platform label space type, a label space identifier X is used for LSP tunnels and a label space identifier Y is used for VPNs. This method of label allocations offers logical separation of applications in label space management as well as in the forwarding plane.

The method 1200 begins at the block 1201. The input 1205 for the method includes a type of the label space, a label space identifier, and identifiers of one or more applications. At block 1210, the router retrieves a label space with the specified label space identifier within the specified label space type.

At decision block 1215, the router determines whether a label space was found. If not, the method 1200 flows to the block 1220 to declare and handle the failure to find a label space. If a label space was found, the method 1200 flows to the block 1225 and the label spaces marked for the specified one or applications. The method 1200 ends at the block 1230.

Figure 13:
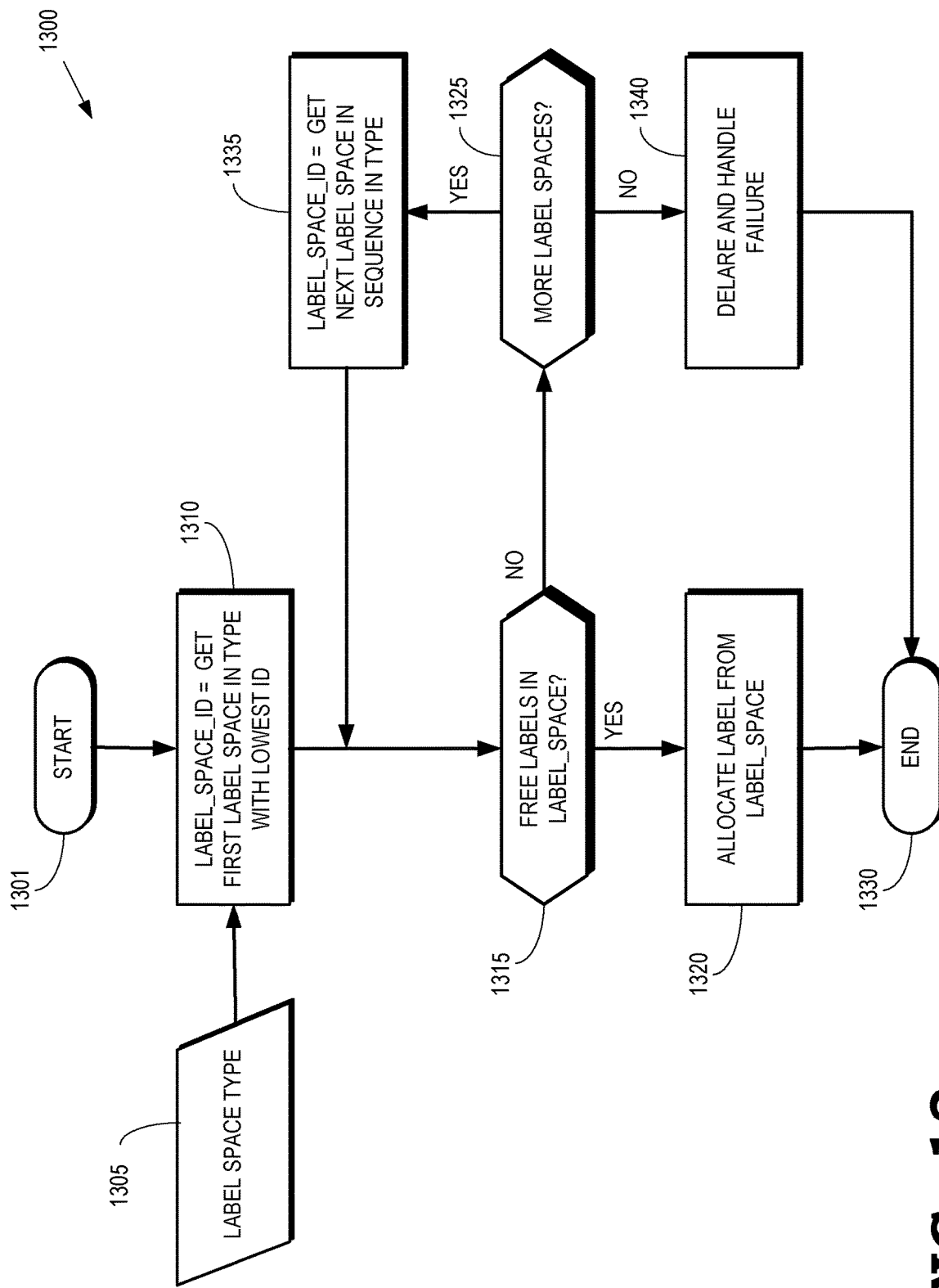
FIG. 13 is a flow diagram of a method of allocating a label for an FEC according to some embodiments.

FIG. 13 is a flow diagram of a method 1300 of allocating a label for an FEC according to some embodiments. The method 1300 is implemented in some embodiments of the communication system 100 shown in FIG. 1 and the communication system 600 shown in FIG. 6. Some embodiments of routers allocate the label by checking for availability of the label in a label space at the lowest identifier. If the label space is exhausted (e.g., all the labels are allocated to FECs), then the router looks for a label in the label space with a subsequent label space identifier.

The method 1300 begins at the block 1301. The input 1305 for the method includes a type of the label spaces. At block 1310, the router retrieves the first label space in the label space type that has the lowest label space identifier. At decision block 1315, the router determines whether there are free labels in the label space. If so, the method 1300 flows to the block 1320. If not, the method flows to the decision block 1325.

At the block 1320, the router allocates the label from the label space. The method 1300 then flows to the block 1330 and the method 1300 ends. At the decision block 1325, the router determines whether there are more label spaces available. For example, the router determines if there is a label space in the label space type that has a subsequent label space ID. If there are more label spaces available, the router retrieves (at block 1335) the next label space in the label space type in the sequence of label space identifiers. The method 1300 then flows to the decision block 1325. If no more label spaces are available, method 1300 flows to the block 1340 and the router declares a failure to allocate a label space and handles the failure. The method 1300 then flows to the block 1330 and the method 1300 ends.

Figure 14:
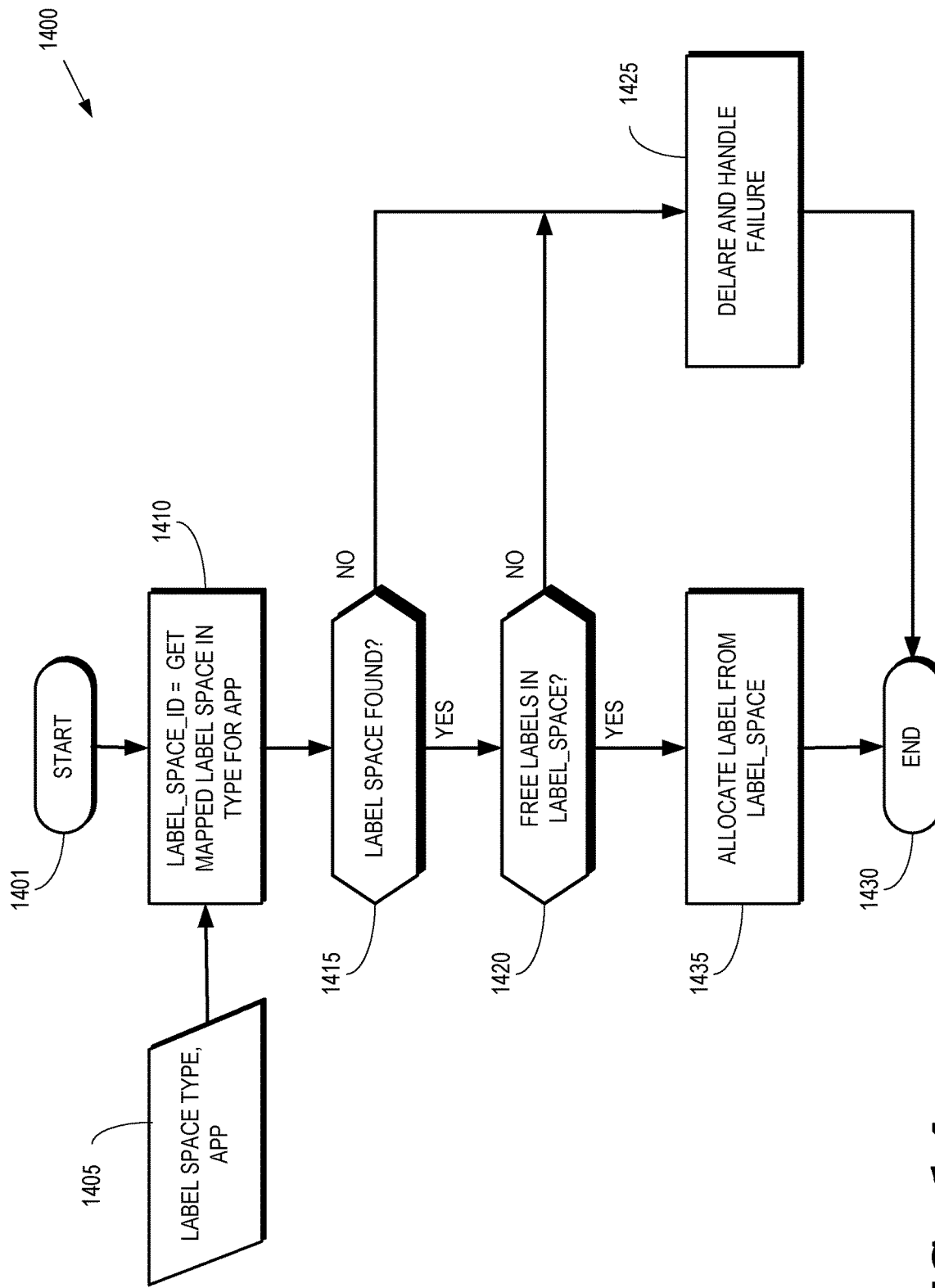
FIG. 14 is a flow diagram of a method of allocating labels to one or more applications from a dedicated label space according to some embodiments.

FIG. 14 is a flow diagram of a method 1400 of allocating labels to one or more applications from a dedicated label space according to some embodiments. The method 1400 is implemented in some embodiments of the communication system 100 shown in FIG. 1 and the communication system 600 shown in FIG. 6.

The method 1400 begins at the block 1401. The input 1405 for the method includes a type of the label spaces and identifiers of one or more applications. At block 1410, the router retrieves a label space in the label space type that is associated with the application.

At decision block 1415, the router determines whether the label space has been found. If so, the method 1400 flows to decision block 1420. If not, the method 1400 flows to the block 1425 and a failure is declared and handled. The method 1400 flows from the block 1425 to the block 1430 and the method 1400 ends.

At decision block 1420, the router determines whether there are free labels available in the label space. For example, the router determines whether there are labels that are not allocated to any FEC. If so, the method 1400 flows to block 1435. If not, the method flows to the block 1425. At the block 1435, a label is allocated from the label space that is associated with the one or more applications. The method 1400 then flows to the block 1430 and the method 1400 ends.

Figure 15:
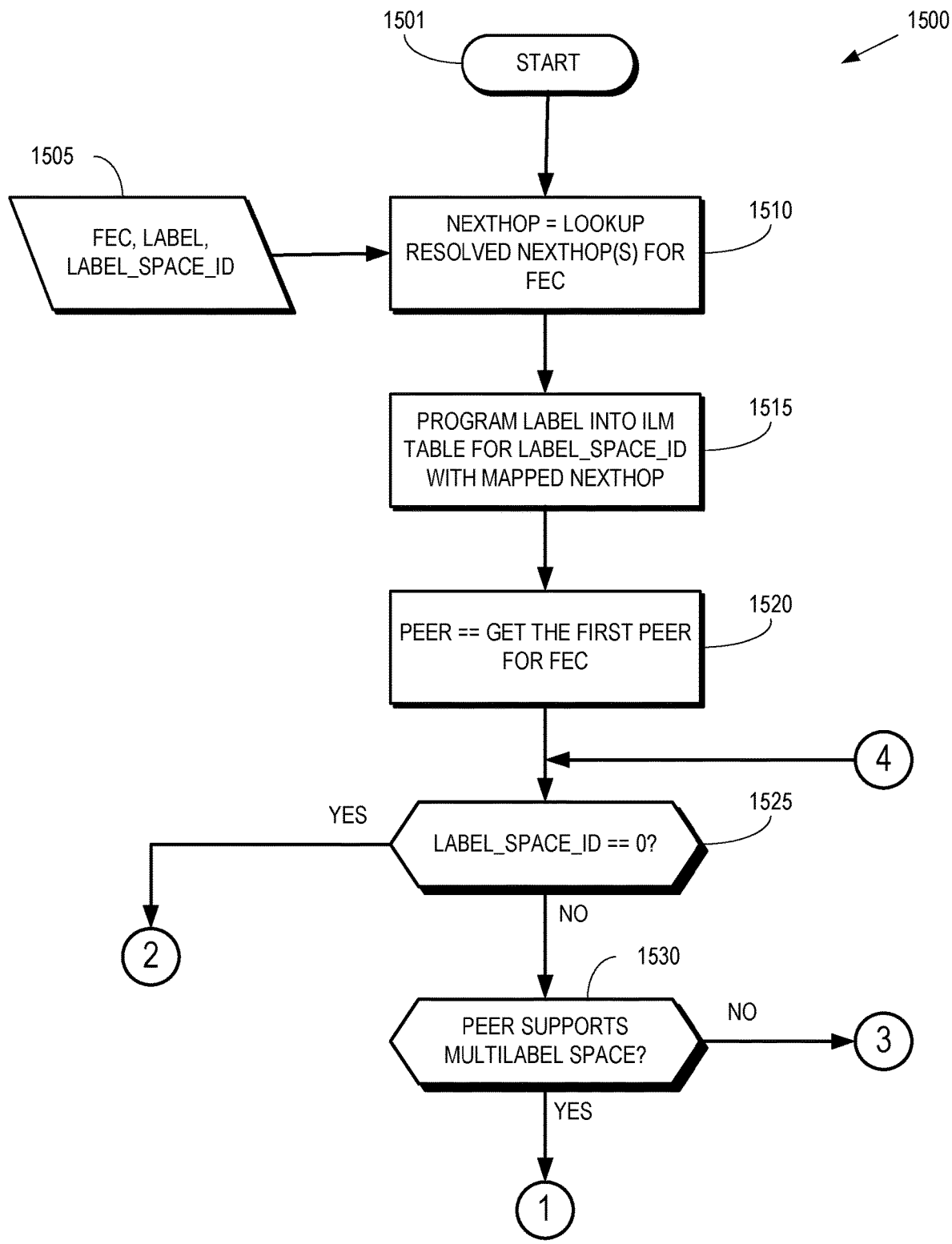
FIG. 15 is a flow diagram of a first portion of a method of distributing label mappings according to some embodiments.

FIG. 15 is a flow diagram of a first portion of a method 1500 of distributing label mappings according to some embodiments. The method 1500 is implemented in some embodiments of the communication system 100 shown in FIG. 1 and the communication system 600 shown in FIG. 6. After a label is allocated from a label space with a specific label space identifier and the label is mapped to an FEC, the router distributes the label mapping and the associated label space identifier to peer routers. The router also programs the label to the ILM Table associated with the label space identifier.

The method 1500 begins at the block 1501. The input 1505 for the method 1500 includes an FEC to which the label is mapped, the label, and a label space identifier of the label space from which the label was allocated.

At block 1510, the router looks up the resolved next hop (or next hops) for the FEC based on the label. The next hop information includes the forwarding information for the FEC. For example, if the FEC is to be forwarded to a downstream router then the information contains the next hop address, a label advertised by the downstream router for the FEC (including the label space identifier of the label in the downstream router, if any), and the like. If the router is the egress router for the FEC, then the next hop information contains information about the native or local processing required for the FEC.

At block 1515, the label is programmed into the forwarding plane ILM Table associated with the label space identifier. The mapped next hop for the label is also programmed into the ILM Table. The programmed ILM Table is used to receive and process packets that are encapsulated with a VLS that includes the label. At block 1520, the router retrieves the first peer router to distribute the label mapping of the FEC.

At decision block 1525, the router determines whether the label space ID of the label is zero. If so, the method 1500 flows to the node 2. If not, the method 1500 flows to the decision block 1530. At the decision block 1530, the router determines whether the peer router is capable of supporting multiple label spaces. In some embodiments, multiple label space capability is configured for the peer router or is dynamically determined based on the MPLS control protocol with the peer router. If the peer router supports multiple label spaces, the method 1500 flows to the node 1. If the peer router does not support multiple label spaces, the method 1500 flows to the node 3.

Figure 16:
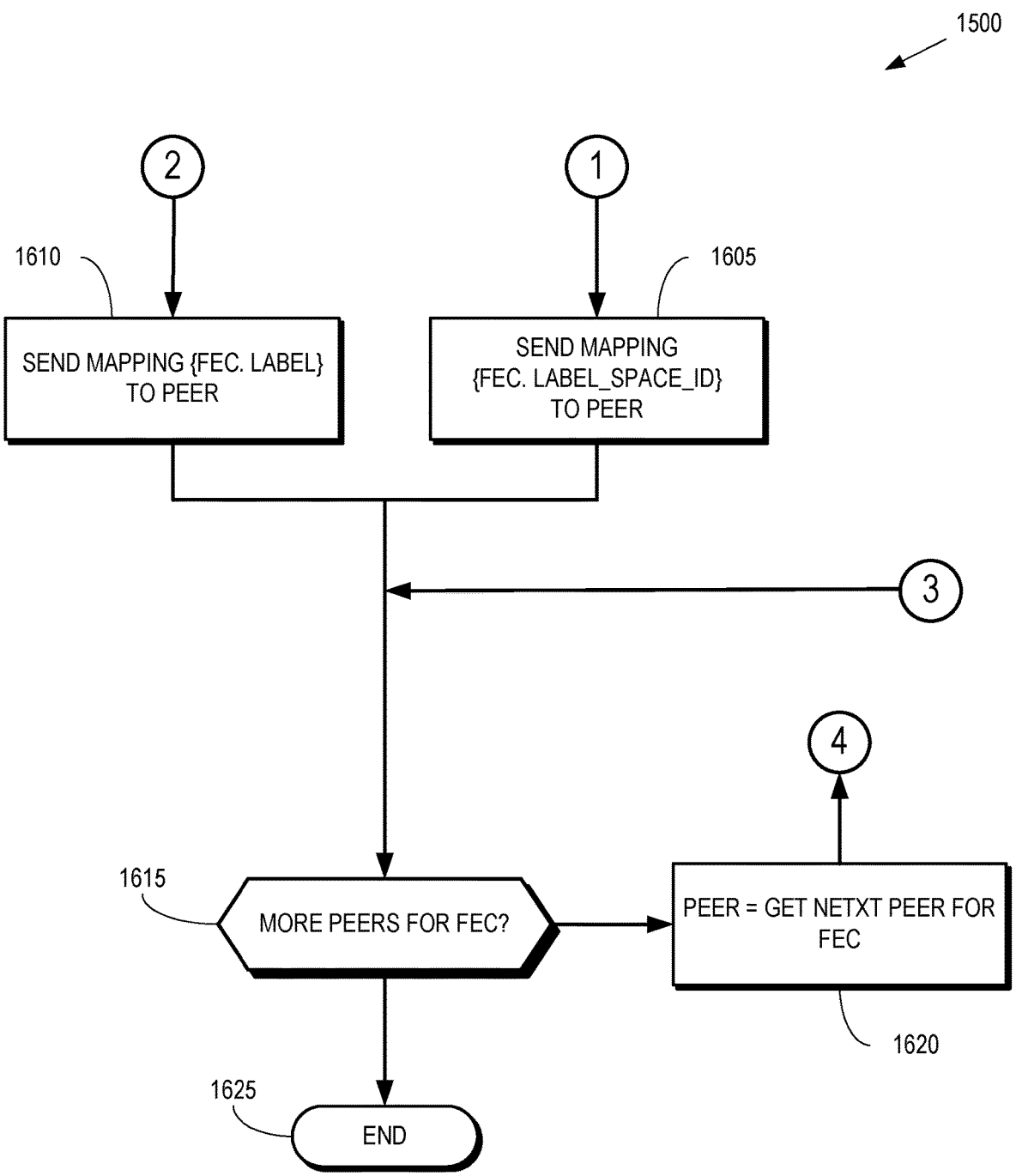
FIG. 16 is a flow diagram of a second portion of the method of distributing label mappings according to some embodiments.

FIG. 16 is a flow diagram of a second portion of the method 1500 of distributing label mappings according to some embodiments. The node 1 links the decision block 1530 in FIG. 15 to the block 1605. The node 2 links the decision block 1525 in FIG. 15 to the block 1610. The node 3 links the decision block 1525 in FIG. 15 to the decision block 1615.

At block 1605, the router advertises the mapping of the FEC, the label, and the label space identifier to the peer routers because the label space identifier is not equal to zero. At the block 1610, the router advertises the mapping of the FEC and the label, and does not include the label space identifier, because the label space identifier is zero. At decision block 1615, the router determines whether there are more peer routers to receive the distributed label mappings for the FEC. If so, the method 1500 flows to the block 1620 and the router retrieves the next peer that is to receive the distributed FEC. The method 1500 then flows to the node 4, which links the block 1620 with the decision block 1525 in FIG. 15. If there are no more peer routers, the method 1500 flows to the block 1625 and the method 1500 ends.

Figure 17:
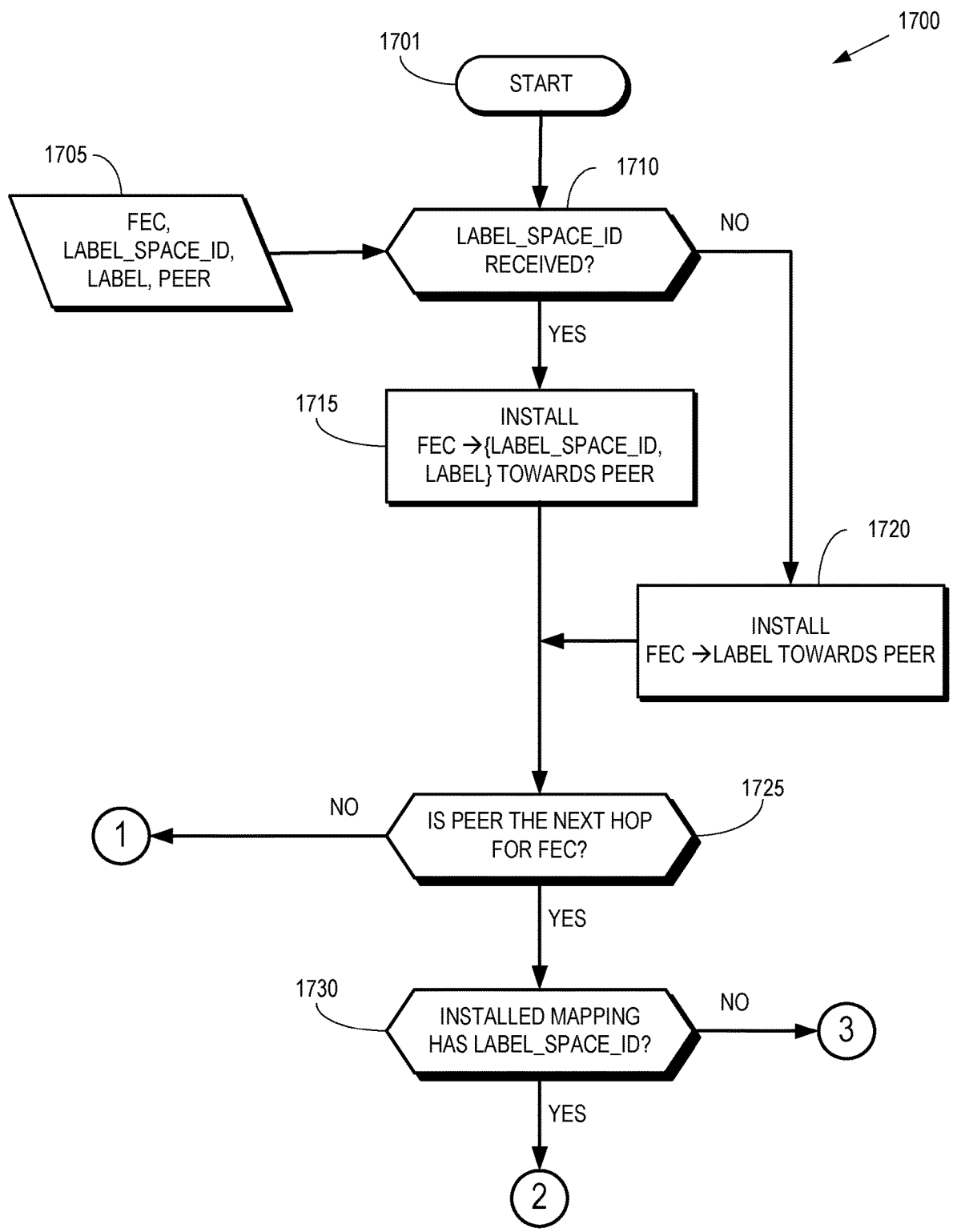
FIG. 17 is a flow diagram of a first portion of a method of processing a label mapping received from a peer router according to some embodiments.

FIG. 17 is a flow diagram of a first portion of a method 1700 of processing a label mapping received from a peer router according to some embodiments. The method 1700 is implemented in some embodiments of the communication system 100 shown in FIG. 1 and the communication system 600 shown in FIG. 6. The router adds the received label mapping into its FEC record as the downstream label mapping from the peer router. If the received label mapping is the resolved next-hop for the FEC then the label mapping is used to forward traffic on the FEC to the peer router. If the router is ingress LER for the FEC then it programs FTN Table in the forwarding plane with the label mapping to peer router as its next-hop. If the router is not the ingress LER then a label is allocated from a label space with a specific label space identifier and the label is mapped to the FEC, the router distributes the label mapping and the associated label space identifier to peer routers. The router also programs the label to the ILM Table associated with the label space identifier with the label mapping to peer router as its next-hop.

The method 1700 begins at the block 1701. The input 1705 for the method 1700 is the label mapping received from a peer router that includes an FEC, a label, and a label space identifier of the label space from which the label was allocated by the peer router. Some embodiments of the input 1705 do not include the label space identifier because the peer router may not have sent a label space identifier if the label is allocated from label space identifier zero or if the peer router has not implemented multiple label spaces.

At decision block 1710, the router determines whether the label space identifier has been received in the label mapping. If so, then the method 1700 flows to block 1715. If not, the method 1700 flows to block 1720.

At block 1715, the router installs the mapping of the label space identifier and the label as the binding of the FEC received from the peer router. The method 1700 then flows to the decision block 1725. At block 1720, the router installs the mapping of the label as the binding of the FEC received from the peer router and the method 1700 flows to decision block 1725.

At decision block 1725, the router determines whether the peer is the next hop for the FEC. In some embodiments, this determination is made using FEC-specific next hop resolution algorithms. If the peer router is not the next hop for the FEC, the method 1700 flows to node 1. If the peer router is the next hop for the FEC, the method 1700 flows to the decision block 1730. At the decision block 1730, the router determines whether the binding of the installed FEC received from the peer has a label space identifier. For example, if the label space identifier was received in the label mapping then the label space identifier will also be in the binding. If the installed mapping has a label space identifier, the method 1700 flows to the node 2. If not, the method 1700 flows to the node 3.

Figure 18:
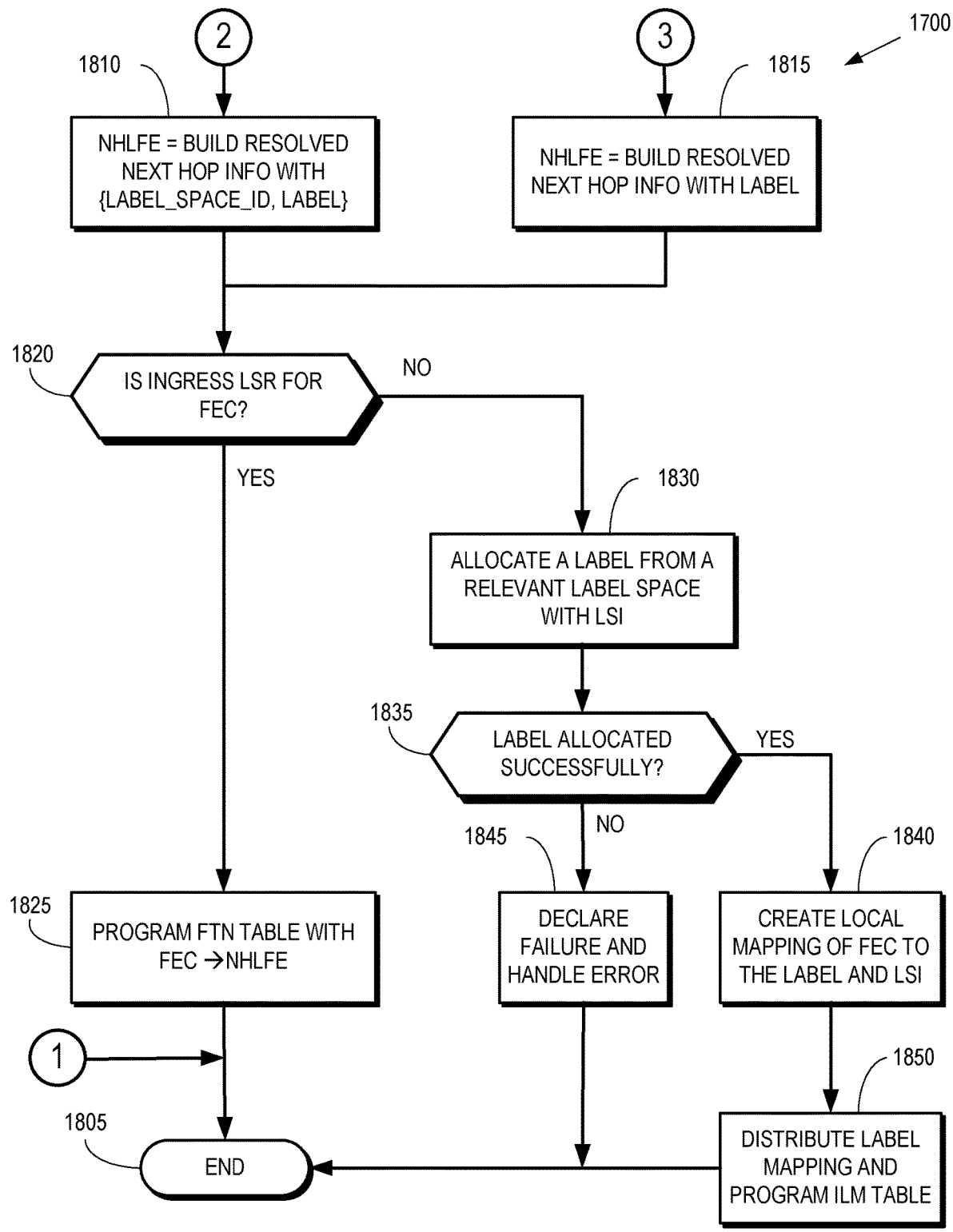
FIG. 18 is a flow diagram of a second portion of the method of processing a label mapping received from a peer router according to some embodiments.

FIG. 18 is a flow diagram of a second portion of the method 1700 of processing a label mapping received from a peer router according to some embodiments. The node 1 links the decision block 1725 in FIG. 17 to the block 1805 and the method 1700 ends at block 1805. The node 2 links the decision block 1730 in FIG. 17 to the block 1810. The node 3 links the decision block 1730 in FIG. 17 to the block 1815.

At block 1810, the router builds the next hop information for the FEC using the binding of the label space ID and label provided by the peer router. The next hop information also contains the next hop address and other relevant information to push a VLS encapsulation on packets for the FEC to the peer. At block 1815, the router builds the next hop information for the FEC using the label binding to the peer router. The next hop information generated in block 1815 also includes a next hop address and other relevant information to push a label on packets for the FEC to the peer router.

At decision block 1820, the router determines whether it is an ingress router for the FEC. If the router is an ingress router for the FEC, the method 1700 flows to block 1825. If the router is not an ingress router for the FEC, the method 1700 flows to block 1830.

At block 1825, the router programs the forwarding plane for the ingress of the FEC. Some embodiments of the router program an FEC-To-NHLFE (FTN) table with the FEC to next-hop information, which is used to push VLS or label encapsulations onto the packets for the FEC to the peer router. The method 1700 then flows to block 1805 and the method 1700 ends.

At block 1830, the router allocates a label from a relevant label space with a label space identifier (LSI). At decision block 1835, the router determines whether the label was allocated successfully. If so, the method 1700 flows to block 1840. If the label was not allocated successfully, the method 1700 flows to block 1845.

At block 1840, the router creates a local mapping of the FEC to the label and the LSI. The method 1700 then flows to block 1850 and the router distributes the local label mapping. The router also programs its ILM table based on the mapping. Some embodiments of the block 1850 are implemented using the method 1500 shown in FIG. 15. The method 1700 then flows to block 1805 and the method 1700 ends.

At block 1845, the router declares a failure in response to determining that the label was not allocated successfully. The router handles the error and then the method 1700 flows to block 1805 and the method 1700 ends.

Figure 19:
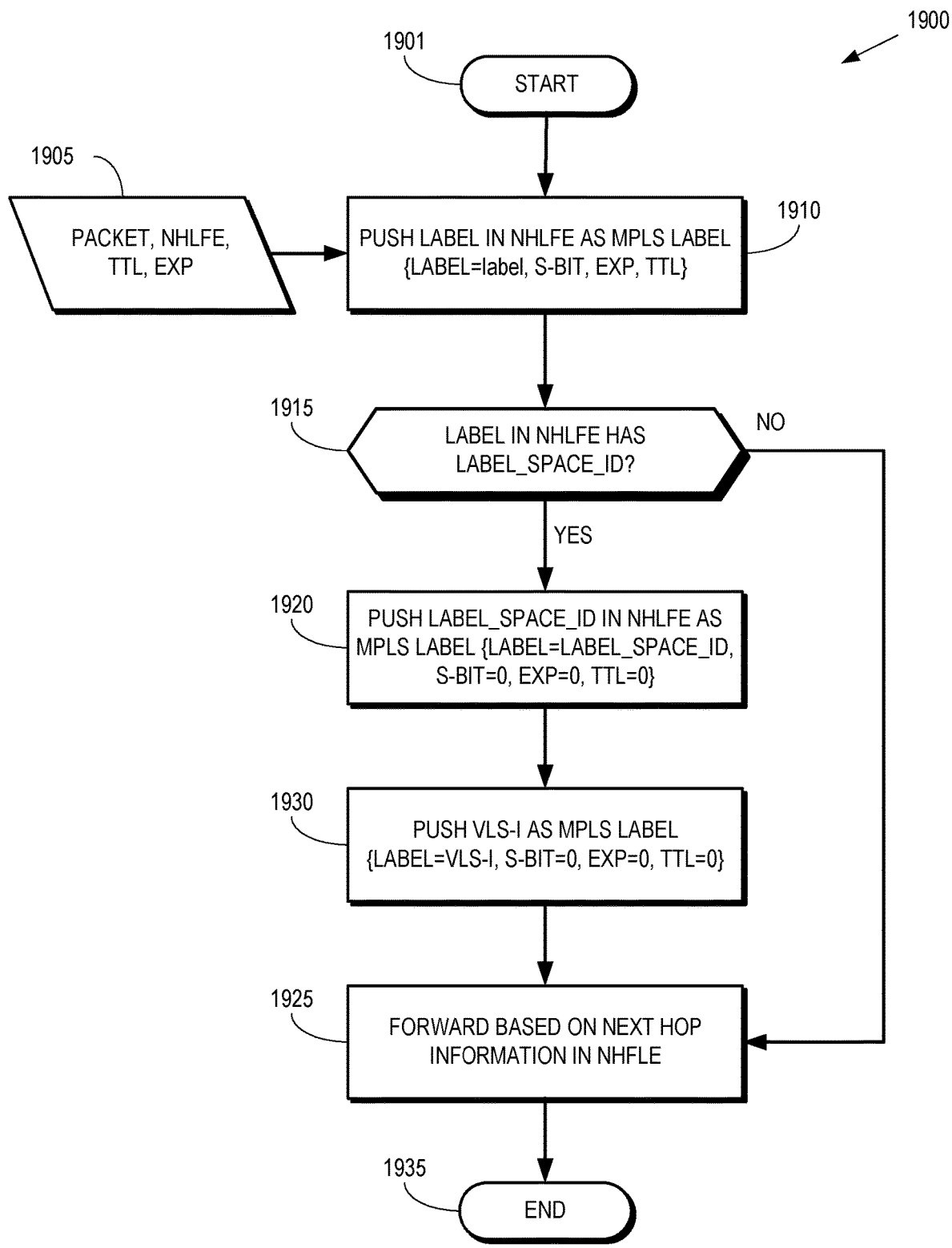
FIG. 19 is a flow diagram of a method of sending VLS encapsulated packets according to some embodiments.

FIG. 19 is a flow diagram of a method 1900 of sending VLS encapsulated packets according to some embodiments. The method 1900 is implemented in some embodiments of the communication system 100 shown in FIG. 1 and the communication system 600 shown in FIG. 6. The method 1900 is implemented in the forwarding plane of an ingress router or a transit router, which encapsulates and transmits a packet with a VLS that includes a label space identifier and a label. An ingress router would look up the FTN Table for an FEC to retrieve the NHLFE information and then pushes the VLS encapsulation onto the packet based on the NHLFE information of the corresponding entry in the FTN Table. A transit router pops the incoming label or VLS on incoming packet and looks up the ILM Table based on the incoming label or VLS to retrieve the NHLFE. Based on the NHLFE, the ingress or transit router pushes the label or VLS to the downstream router and then sends the resultant packet to the downstream router. In the illustrated embodiment, the method 1900 performs the transmission process to send MPLS packets to a downstream router with a VLS or label that is distributed by the downstream router, as discussed herein.

The method 1900 begins at the block 1901. The input 1905 for the method 1900 includes a packet, an NHLFE provided by an FTN Table, a time-to-live (TTL), and an EXP parameter as discussed above. Some embodiments of an ingress router may set the input TTL to a maximum value or a custom value. The value of the EXP parameter may be set to a value that indicates the forwarding class for the packet. Some embodiments of the transit router may set the input TTL after decrementing the TTL on the incoming label by one. The transit router may also set the EXP parameter to a value that is the same as the value of the EXP parameter received in the incoming label or a custom value.

At block 1910, the router pushes the label from the NHLFE onto the packet as an MPLS label that includes a label, an S-bit, an EXP parameter, and a TTL. The S-bit is set to zero if there are other labels on top of the packet, otherwise the S-bit is set to 1 to indicate that this label is at the bottom of the stack.

At decision block 1915, the router determines whether a label space identifier is programmed into the NHLFE for the label. If a label space identifier is programmed, the method 1900 flows to block 1920. If no label space identifier is programmed, the method 1900 flows to block 1925.

At block 1920, the router includes the label space identifier as an MPLS Label=(Label=Label Space ID, S-bit=0, EXP=0, TTL=0) and pushes the MPLS label onto the packet. At block 1930, the router encodes the VLS-I as an MPLS Label=(Label=VLS-I, S-bit=0, EXP=0, TTL=0) and pushes the MPLS label onto the packet. The method 1900 then flows to block 1925.

At block 1925, the router forwards the packet to the downstream router based on the next hop information included in the NHLFE. The packet is encapsulated with a single MPLS label (if the method 1900 flowed from decision block 1915) or the packet is encapsulated with the VLS (if the method 1900 flowed from the block 1930). Some embodiments of the router add additional encapsulation on the packet in order to send the packet to one or downstream routers. The method 1900 then flows to block 1935 and the method 1900 ends.

Figure 20:
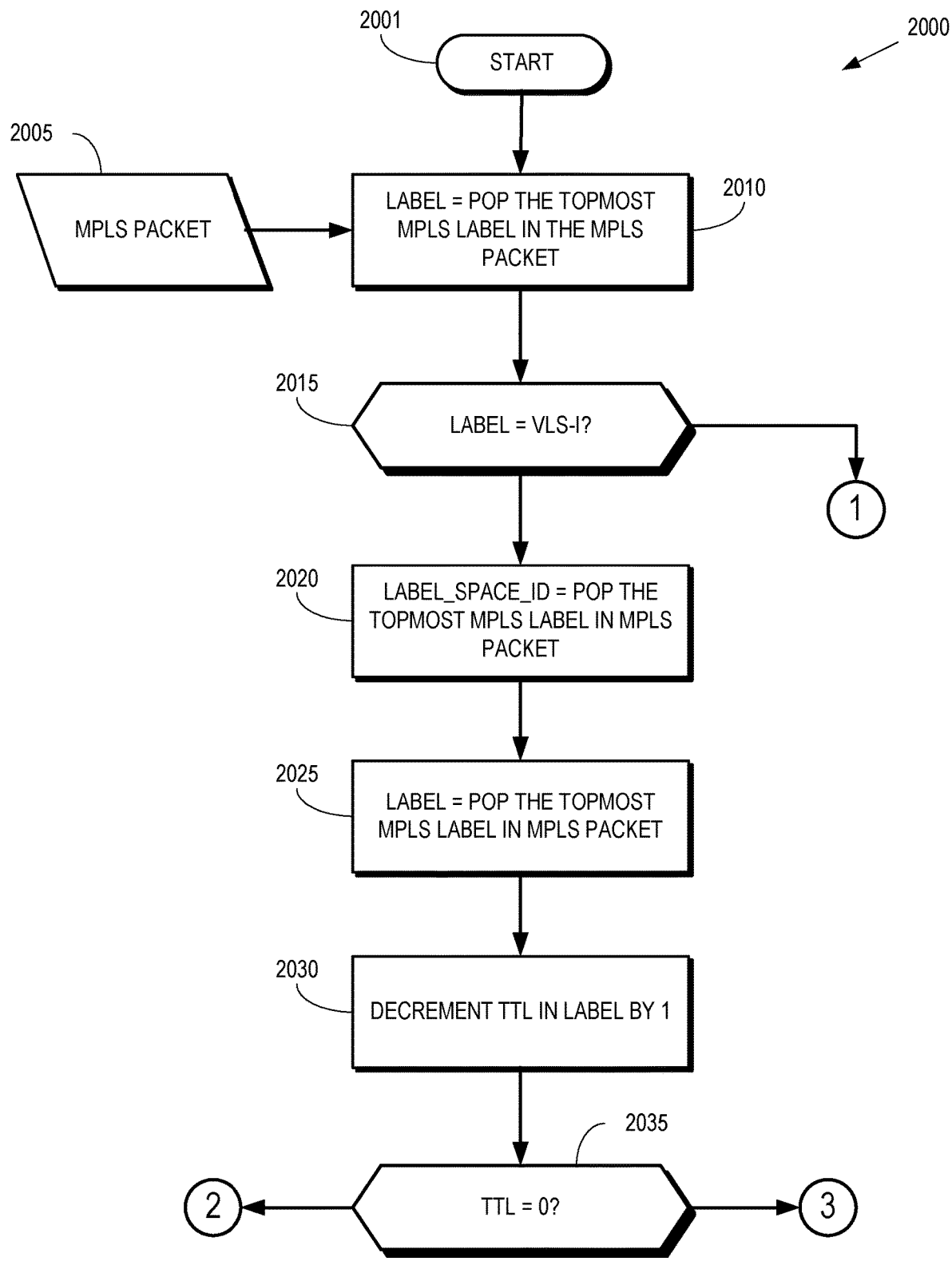
FIG. 20 is a flow diagram of a first portion of a method of processing VLS encapsulated packets according to some embodiments.

FIG. 20 is a flow diagram of a first portion of a method 2000 of processing VLS encapsulated packets according to some embodiments. The method 2000 is implemented in some embodiments of the communication system 100 shown in FIG. 1 and the communication system 600 shown in FIG. 6. The method 2000 is implemented in the forwarding plane of a transit router or an egress router to process VLS encapsulated packets that are received from upstream routers.

The method 2000 begins at the block 2001. The input 2005 for the method 2000 is an MPLS packet that includes a VLS encapsulated packet. At block 2010, the router pops and reads the topmost MPLS label in the received packet. At decision block 2015, the router determines whether the label value is VLS-I. If the label value is VLS-I, the method 2000 flows to block 2020. If the label value is not VLS-I, which indicates that the packet is not a VLS encapsulation, the method 2000 flows to node 1.

At block 2020, the router pops and reads the topmost MPLS label in the packet, which encodes the label space identifier. At block 2025, the router pops and reads the topmost MPLS label in the packet, which is the label to be processed in the context of the label space identifier. At block 2030, the router decrements the TTL included in the label by one. At decision block 2035, the router determines whether the TTL is equal to zero. If the TTL is equal to zero, the method 2000 flows to node 2. If the TTL is not equal to zero, the method 2000 flows to node 3.

Figure 21:
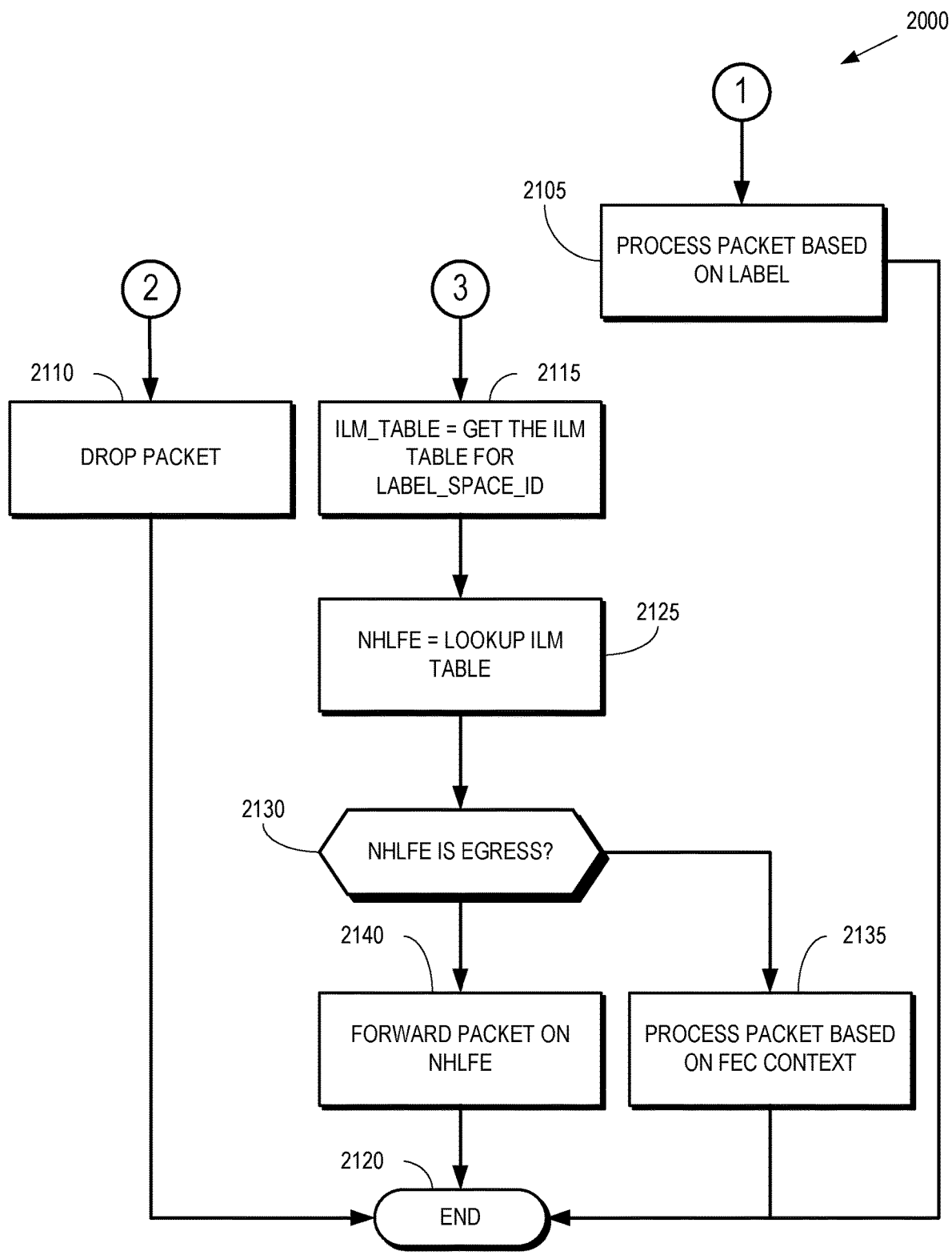
FIG. 21 is a flow diagram of a second portion of the method of processing VLS encapsulated packets according to some embodiments.

FIG. 21 is a flow diagram of a second portion of the method 2000 of processing VLS encapsulated packets according to some embodiments. The node 1 links the decision block 2015 in FIG. 20 to the block 2105. The node 2 links the decision block 2035 in FIG. 20 to the block 2110. The node 3 links the decision block 2035 in FIG. 20 to the block 2115.

At block 2105, the router process of the packet in the context of the popped label. In some cases, processing of the packet by the router includes popping additional MPLS labels and the router may encounter a VLS-I as the topmost MPLS label. In that event, the packet is recirculated back to block 2001 as input to the method 2000. The method 2000 then flows to block 2120 and the method 2000 ends.

At block 2110, the router drops the packet. The method 2000 then flows to block 2120 and the method 2000 ends.

At block 2115, the router retrieves the ILM Table for the label space identifier included in the packet. At block 2125, the router looks up the label in the ILM Table to make a forwarding decision. At decision block 2130, the router determines whether the NHLFE indicates that the router is an egress router for the label. If the router is an egress router, the method 2000 flows to block 2135. If the router is not an egress router, the method 2000 flows to block 2140.

At block 2135, the router processes the packet based on the context of the FEC associated with the NHLFE. The method 2000 then flows to block 2120 and the method 2000 ends. At the block 2140, the router processes the packet based on the NHLFE and forwards the packet to the designated downstream router. The method 2000 then flows to block 2120 and the method 2000 ends.

The MPLS control plane implements mechanisms to include Label Space ID in the label mappings exchanged between a pair of LSRs. Various MPLS control plane protocols are LDP, RSVP-TE, BGP, OSPF, IS-IS, OSPFv3, BGP-LS or the likes. FIG. 22 is a multi-label space capability type-length-value (TLV) 2200 in label distribution protocol (LDP) according to some embodiments. The TLV 2200 is carried by LDP Initialization messages or LDP Capability messages to negotiate multiple label space capability in a peering LDP session. The values in TLV 2200 have the following definitions:

U-bit:
Unknown TLV bit, as described in [LDP]. The value must be set to 1 to indicate that peer router should ignore this TLV if the TLV Code Point is unknown to the peer router.
F-bit:
Forward unknown TLV bit, as described in [LDP]. The value of this bit MUST be 0 since a Capability Parameter TLV is sent only in Initialization and Capability messages, which are not forwarded.
TLV Code Point:
The TLV type that identifies multi-label space capability. If the invention is standardized then the value must be reserved in IANA registry for LDP capability TLVs.
S-bit:
The State Bit. It indicates whether the sender is advertising or withdrawing the capability corresponding to the TLV code point. The State Bit value is used as follows:
1 - The TLV is advertising the capability specified by the TLV code point.
0 - The TLV is withdrawing the capability specified by the TLV code point.
If Multi-Label Space Capability is negotiated in a peering session then label mappings with Label Space ID can be distributed over the peering sessions in label mapping related messages. Let's say an LDP speaker A decides to advertise Label Mapping to neighbor B for the same FEC X but B hasn't advertised Multi-Label Space capability. In that case the Label Mapping for FEC X should be sent to B by allocating the label from the Label Space ID 0.

FIG. 23 is a multi-space label TLV in LDP according to some embodiments. Traditionally LDP uses Generic Label TLV, ATM Label TLV or Frame Relay Label TLV that encodes labels in its label distribution messages such as Label Mapping, Label Withdraw, Label Release etc. The multi-space label TLV carries a label allocated from a label space with a label space identifier. The multi-space label TLV is included in LDP's label distribution messages when distributed label is allocated from a label space with a label space identifier.

FIG. 24 is a label object 2400 in RSVP-TE according to some embodiments. An RSVP object follows the header containing Length, Class-Num, C-Type. The contents of a LABEL is a single label, encoded in 4 octets. Each generic MPLS label is an unsigned integer in the range 0 through 1048575. Generic MPLS labels and FR labels are encoded right aligned in 4 octets. ATM labels are encoded with the VPI right justified in bits 0-15 and the VCI right justified in bits 16-31.

FIG. 25 is a multi-space label object 2500 in RSVP-TE according to some embodiments. The rules of processing Multi-Space Label Object 2500 are the same as the Label Object, except the fact that Multi-Space Label Object 2500 carries additionally the Label Space ID from which the label is allocated.

Figure 26:
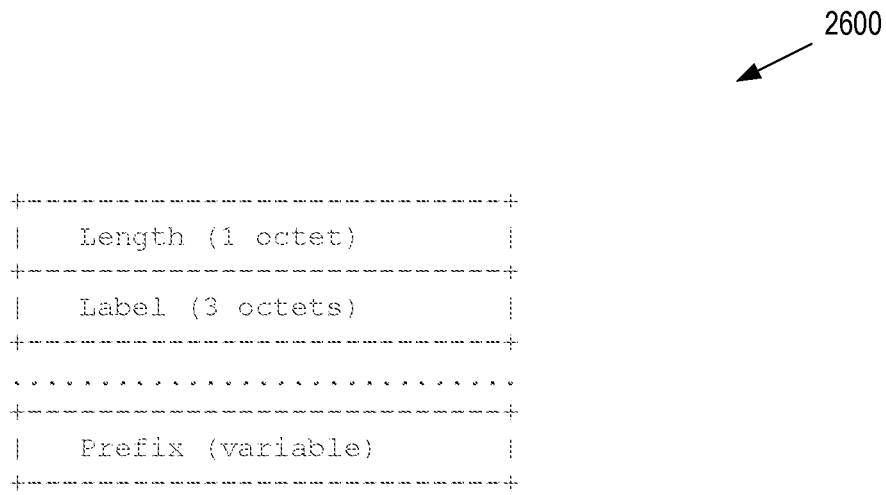
FIG. 26 illustrates label information in the network layer reachability information (NLRI) in BGP according to some embodiments.

FIG. 26 illustrates label information 2600 in the network layer reachability information (NLRI) in BGP according to some embodiments. Label mapping information is carried as part of the NLRI in the Multiprotocol Extensions attributes. The AFI indicates the address family of the associated route. The fact that the NLRI contains a label is indicated by using SAFI value 4. The Network Layer Reachability information is encoded as one or more triples of the form <length, label, prefix>.

Figure 27:
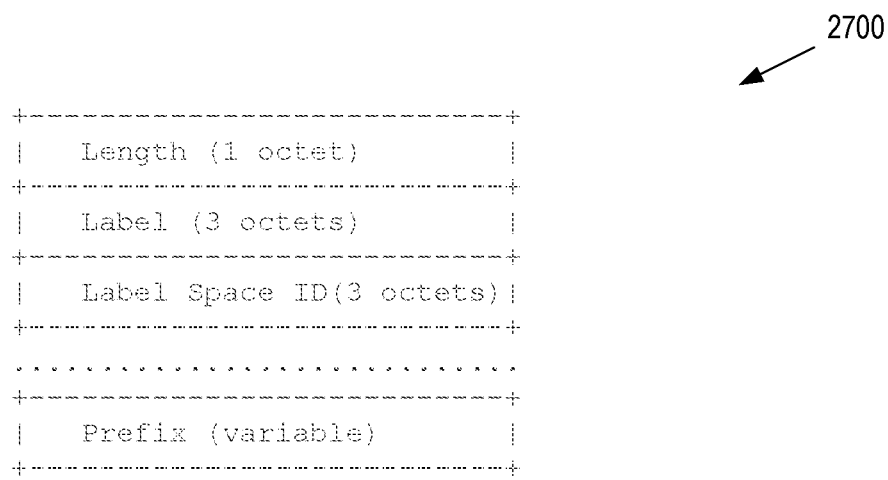
FIG. 27 illustrates NLRI for multi-space label subsequent address family identifiers (SAFI) in BGP according to some embodiments.

FIG. 27 illustrates NLRI 2700 in BGP for multi-space label subsequent address family identifiers (SAFI) according to some embodiments. The NLRI 2700 includes a label space identifier from which the label is allocated. Note that BGP supports various AFIs that include label information. Such AFIs are used for advertising labels in VPNs, Layer-2 VPN such as VPLS, E-VPNs etc. In the similar way as above, NLRIs for such AFIs can be extended with new SAFI types that includes the Label Space ID along with label.

Segment Routing (SR) is an architecture for source routing in MPLS for stateless tunneling of MPLS packets. In SR, labels are assigned to network elements such as the router/node, adjacencies between routers, IGP areas etc. In SR, the network elements are termed as "Segments". Then an ingress router pushes a stack of MPLS labels which identifies a path to be traversed by the packet. Each label identifies a segment along the path. The segments and their label mappings (e.g., Segment Identifiers or SIDs) are advertised across a network by link-state-routing protocols (IS-IS, OSPF and OSPFv3). Each router originates SIDs for its LSAs (LSAs carry state of segments) and distributes across the network via respective IGP protocol. This invention describes the methods in IS-IS, OSPF and OSPFv3 that need to be introduced for Segment Routing operating with multiple label spaces. The invention also describes the methods in BGP-LS to distribute the SIDs to an external agent (e, g PCE).

Various SR Segment Identifiers (SID) are distributed by the IS-IS Protocol. A SID describes label mapping assigned to specific segment in the network. The encodings for Prefix-SID, the Adjacency-SID, the LAN-Adjacency-SID and the Binding-SID are defined by existing specification of IS-IS protocol. In some embodiments, new SID definitions are defined to distribute label mappings with multiple label space support, i.e., the label mappings include Label Space ID. The SID includes a label space identifier.

FIG. 28 is a prefix segment identifier (SID) 2800 in IS-IS according to some embodiments. The prefix SID 2800 represents label mapping of a routable IPv4 or IPv6 prefix in the network.

FIG. 29 illustrates the 1-octet flags 2900 in prefix SID in IS-IS according to some embodiments. The flags 2900 indicate characteristics of the SID/index/label field in the prefix SID in IS-IS. The flags 2900 include an M-flag that indicates if it is a multi-space prefix SID. If the M-flag is set, then it is a multi-space prefix SID and carries a 4-octet label space identifier before the SID/index/label field. The label space identifier indicates the label space from which the SID/index/label is allocated.

Figure 30:
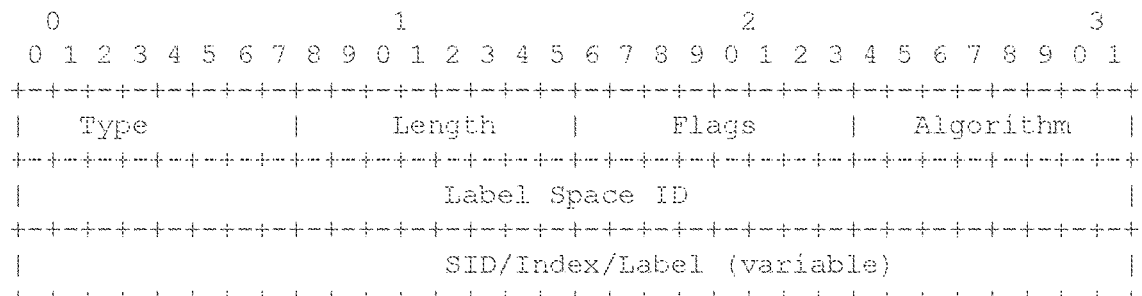
FIG. 30 is a multi-space prefix SID in IS-IS according to some embodiments.

FIG. 30 is a multi-space prefix SID 3000 in IS-IS according to some embodiments.

Figure 31:
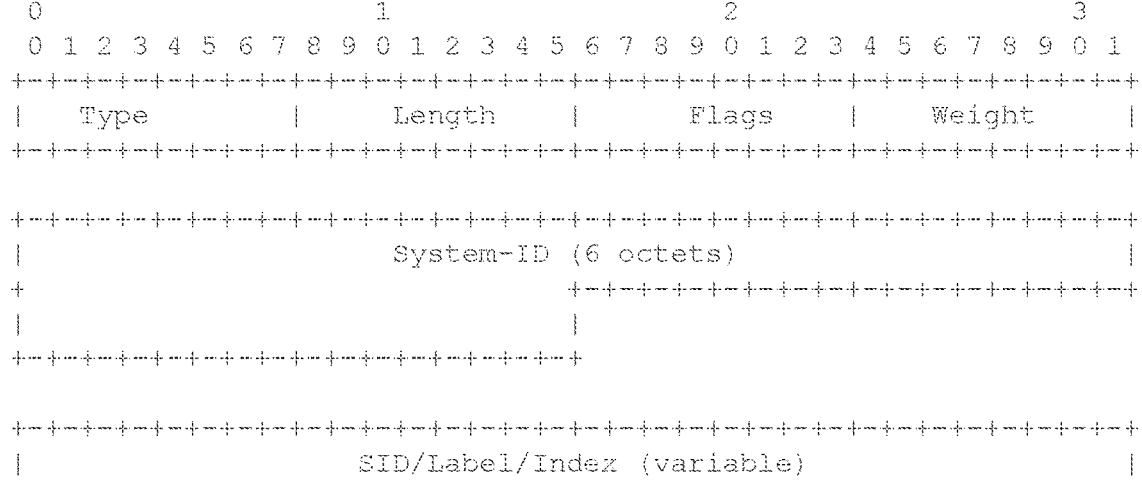
FIG. 31 is an adjacency SID in IS-IS according to some embodiments.

FIG. 31 is an adjacency SID 3100 in IS-IS according to some embodiments. An adjacency SID represents label mapping of an IPv4 or IPv6 adjacency between a pair of routers in the network.

FIG. 32 illustrates the 1-octet flags field 3200 in adjacency SID in IS-IS according to some embodiments. The flags indicate the characteristics of the SID/index/label field. The flags 3200 include an M-flag that indicates if it is a multi-space adjacency SID. If the M-flag is set, then it is a multi-space adjacency SID and there is a 4 octet label space identifier field before the SID/label/index field.

FIG. 33 is a multi-space adjacency SID 3300 according to some embodiments.

Segment Routing requires each router to advertise its SR forwarding plane capability and the range of MPLS label values it uses for Segment Routing in the case where global SIDs are allocated (i.e. global indexes).

FIG. 34 is an SR-Capabilities sub-TLV 3400 in IS-IS according to some embodiments. The sub-TLV 3400 has type, length, and flags followed by multiple segment routing global block (SRGB) descriptor entries, which are described below:

Length: variable.
Flags: 1 octet of flags.
FIG. 35 illustrates the 1-octet of flags 3500 in SR-Capabilities sub-TLV in IS-IS according to some embodiments. The following flags are defined:
1-Flag: MPLS IPv4 flag. If set, then the router is capable of processing SR MPLS encapsulated IPv4 packets on all interfaces.
V-Flag: MPLS IPv6 flag. If set, then the router is capable of processing SR MPLS encapsulated IPv6 packets on all interfaces.
Some embodiments of the M-flag are defined as below:
M-flag: Multi-Space Flags. If set, then the router is capable of allocating labels from multiple label spaces and processing VLS encapsulated packets on all interfaces.

FIG. 36 is an SID/label sub-TLV 3600 in IS-IS according to some embodiments. Each SRGB descriptor entry has 3-octets of Range and SID/Label Sub-TLV. The SID/Label Sub-TLV contains the first value of the SRGB while the Range contains the number of SRGB elements. In this encoding:
Type: 1
Length variable
SID/Label if length is set to 3 then the 20 rightmost bits represent a MPLS label.

FIG. 37 is a multi-space SID/label sub-TLV 3700 in IS-IS according to some embodiments. The multi-space SID/label sub-TLV 3700 includes a label space identifier. A Multi-Space SRGB descriptor entry has 3-octets of Range and Multi-Space SID/Label Sub-TLV. The Multi-Space SID/Label Sub-TLV contains the first value of the Multi-Space SRGB while the Range contains the number of SRGB elements. The Label Space for the entire range is indicates by the Label Space ID field in the Multi-Space SID/Label Sub-TLV 3700. In some embodiments, the SR Local Block Sub-TLV that contains the range of labels the node has reserved for Adjacency-SIDs. As an example, an application or a controller may instruct the router to allocate a specific local SID. Therefore, for such applications or controllers to know what are the local SIDs available in the router, it is required that the router advertises its SRLB. The format of SR Local Block Sub-TLV is same as SR-Capabilities Sub-TLV described above. If a range is allocated from a label space with a specific Label Space ID then Multi-Space SID/Label sub-TLV 3700 is encoded in the corresponding SRGB descriptor entry.

FIG. 38 is an SID-Label Binding TLV 3800 in IS-IS according to some embodiments. The SID/Label Binding TLV 3800 is used to advertise prefixes to SID/Label mappings. This functionality is called Segment Routing Mapping Server (SRMS). The SRMS function of a SR capable router allows distribution of mappings for prefixes not locally attached to the advertising router and therefore allows advertisement of mappings on behalf of non-SR capable routers.

Various SR Segment Identifiers (SID) in an IPv4 network are distributed by the OSPF Protocol. A SID describes label mapping assigned to specific segment in the network. The encodings for Prefix-SID, the Adjacency-SID, the LAN-Adjacency-SID and the Binding-SID are defined by existing specification of OSPF protocol. The Segment Routing Capabilities are advertised by a router node.

FIG. 39 is a prefix-SID 3900 in OSPF according to some embodiments. The prefix-SID 3900 represents label mapping of a routable IPv4 prefix in the network and is distributed with a Prefix LSA as its attribute (sub-tlv). Specifically, Prefix-SID Sub-TLV is a sub-TLV of the OSPF Extended Prefix TLV and OSPF Extended Prefix Range TLV.

FIG. 40 illustrates the 1-octet flags field 4000 in prefix-SID in OSPF according to some embodiments. The flags 4000 include an M-flag to indicate if it is a multi-space prefix SID. If the M-flag is set, then it is a multi-space prefix SID and there is a 4 octet label space identifier field before the SID/label/index field.

FIG. 41 is a multi-space prefix-SID 4100 in OSPF when M-Flag is set according to some embodiments.

FIG. 42 is an adjacency SID 4200 in OSPF according to some embodiments.

FIG. 43 is a local area network (LAN) adjacency SID 4300 in OSPF according to some embodiments.

FIG. 44 illustrates the 1-octet flags field 4400 in adjacency SID or LAN adjacency SID in OSPF according to some embodiments. The flags 4000 include an M-flag to indicate if it is a multi-space adjacency SID or LAN adjacency SID. If the M-flag is set, then it is a multi-space adjacency SID or LAN adjacency SID and there is a 4 octet label space identifier field in the adjacency SID before the SID/label/index field.

FIG. 45 is a multi-space adjacency SID 4500 when the M-flag is set according to some embodiments.

Figure 46:
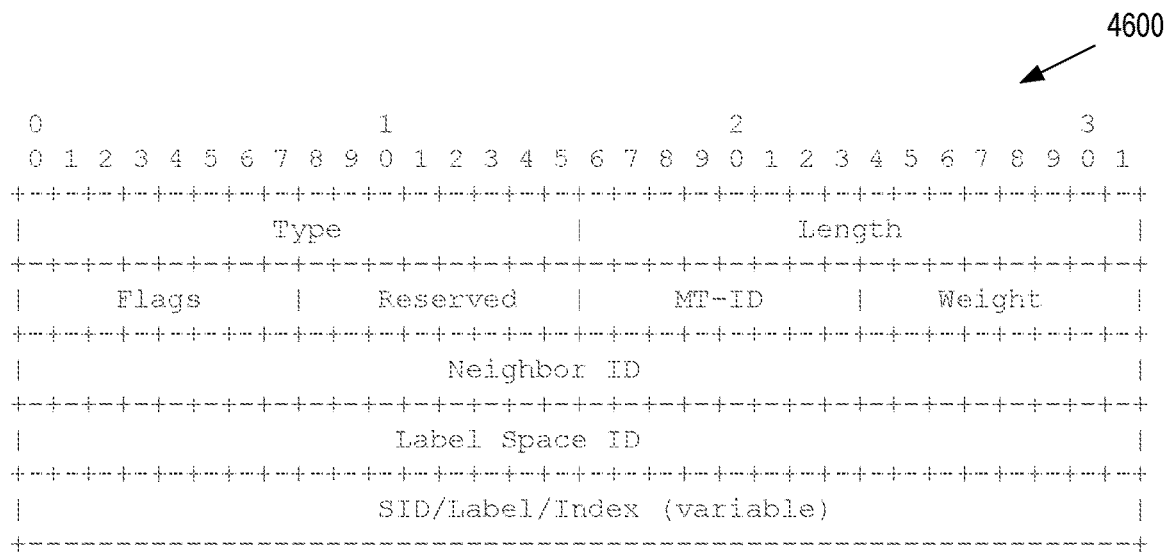
FIG. 46 is a LAN adjacency SID in OSPF when the M-flag in the 1-octet flags field in LAN adjacency SID in OSPF is set according to some embodiments.

FIG. 46 is a multi-space LAN adjacency SID 4600 when the M-flag is set according to some embodiments.

Figure 47:
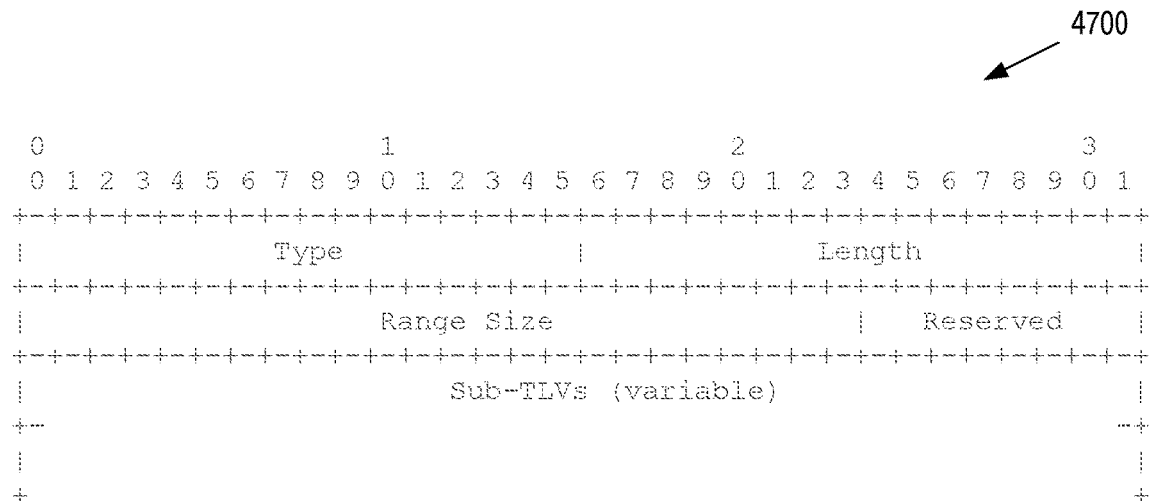
FIG. 47 is an SID/Label range TLV in OSPF according to some embodiments.

FIG. 47 is an SID/Label range TLV 4700 in OSPF according to some embodiments. Some embodiments of prefix SIDs are advertised in a form of an index. Such index defines the offset in the SID/Label space advertised by the router. The SID/Label Range TLV is used to advertise such MPLS SID/Label space. The SID/Label Range TLV is a top-level TLV of the Router Information Opaque LSA in OSPF. In some cases the fields are:
Type: 9
Length: Variable, dependent on Sub-TLVs.
Range Size: 3-octet SID/label range size (i.e., the number of SID or labels in the range including the first SID/label), greater than 0.

FIG. 48 is an SID/Label sub-TLV 4800 in OSPF according to some embodiments.

In some cases:
Type: 1
Length: Variable, 3 or 4 octets
SID/Label: If length is set to 3, then the 20 rightmost bits represent a label. If length is set to 4, then the value represents a 32-bit SID.
The receiving router ignores the SID/Label Sub-TLV if the length is other then 3 or 4.
The SID/Label Sub-TLV is included in the SID/Label Range TLV. The SID/Label advertised in the SID/Label Sub-TLV represents the first SID/Label in the advertised range.
Only a single SID/Label Sub-TLV may be advertised in SID/Label Range TLV. If more than one SID/Label Sub-TLVs are present, the SID/Label Range TLV is ignored.

FIG. 49 is a multi-space SID/Label sub-TLV 4900 in OSPF according to some embodiments. Presence of this Sub-TLV 49900 means the SID/Label carried by it is allocated from the label space identified by the Label Space ID. An OSPF router that supports multiple label spaces MUST send a SID/Label Range TLV for that includes Multi-Space SID/Label Sub-TLVs (type=4). This indicates that the router is capable of forwarding VLS encapsulated packets. Any Multi-Space Prefix SIDs advertised by the router in the form of an index must the offset into the Label space advertised in Multi-Space SID/Label Sub-TLV.

Figure 50:
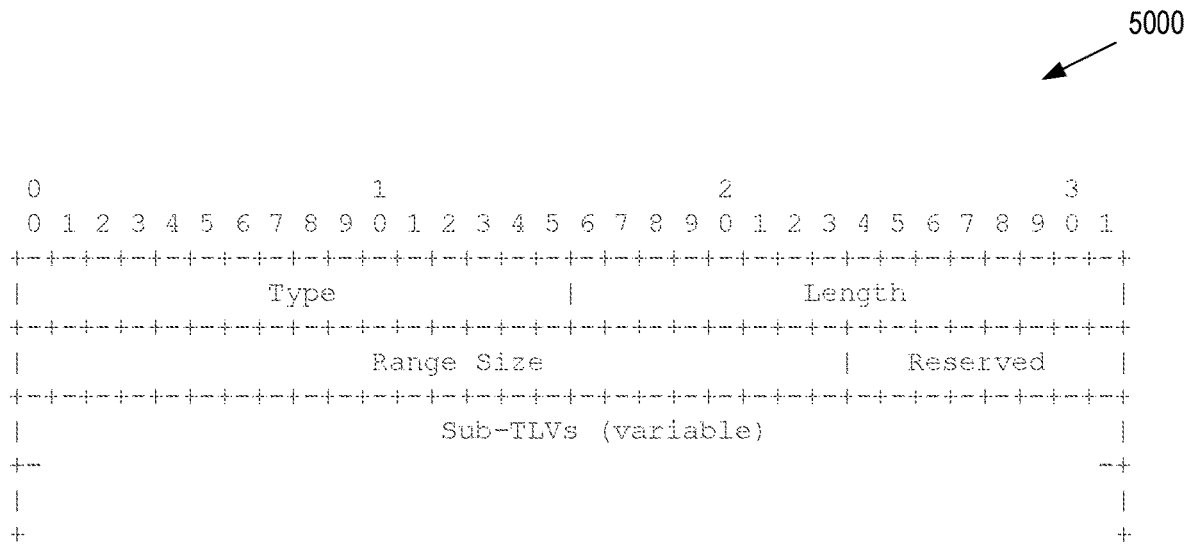
FIG. 50 is an SRLB TLV in OSPF according to some embodiments.

FIG. 50 is an SRLB TLV 5000 in OSPF according to some embodiments. The SRLB TLV 5000 contains the range of labels the node has reserved for local SIDs. SIDs from the SRLB may be used for Adjacency-SIDs, but also by components other than the OSPF protocol. As an example, an application or a controller may instruct the router to allocate a specific local SID. Some controllers or applications may use the control plane to discover the available set of local SIDs on a particular router. In such cases, the SRLB is advertised in the control plane.

Some embodiments of the SRLB TLV 5000 use:
Type: 12
Length: Variable, dependent on Sub-TLVs.
Range Size: 3-octet SID/label range size (i.e., the number of SIDs or labels in the range including the first SID/label). It MUST be greater than 0.
Initially, the only supported Sub-TLV is the SID/Label Sub-TLV. The SID/Label Sub-TLV is included in the SRLB TLV. The SID/Label advertised in the SID/Label Sub-TLV represents the first SID/Label in the advertised range.
Only a single SID/Label Sub-TLV may be advertised in the SRLB TLV. If more than one SID/Label Sub-TLVs are present, the SRLB TLV is ignored.
Some embodiments stipulate a router that supports multiple label spaces as per this invention may send a SRLB TLV that includes a Multi-Space SID/Label Sub-TLV (type=4). Any Multi-Space Adj-SIDs advertised by the router in the form of an index is offset into the Label space advertised in Multi-Space SID/Label Sub-TLV in the SRLB TLV 5000.

Figure 51:
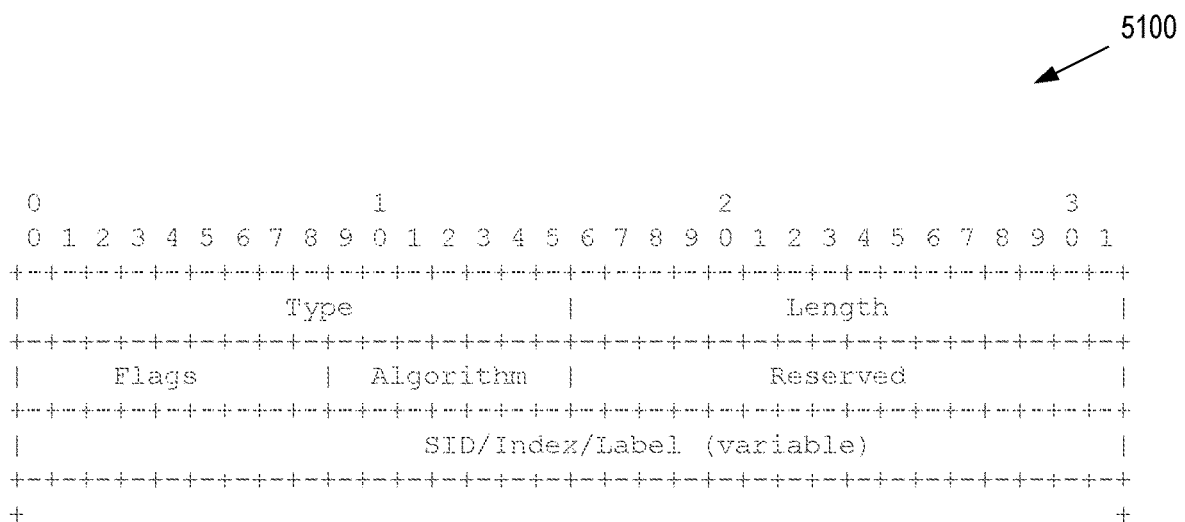
FIG. 51 is a prefix-SID in OSPFv3 according to some embodiments.

Various SR Segment Identifiers (SID) in an IPv6 network are distributed by the OSPFv3 Protocol. A SID describes label mapping assigned to specific segment in the network. The encodings for Prefix-SID, the Adjacency-SID, the LAN-Adjacency-SID and the Binding-SID are defined by existing specification of OSPFv3 protocol. The Segment Routing Capabilities are advertised by a router node. A prefix-SID represents label mapping of a routable IPv6 prefix in the network and is distributed with a Prefix LSA as its attribute (sub-tlv). Specifically, Prefix-SID Sub-TLV is a sub-TLV of the following TLVs.
Intra-Area Prefix TLV
Inter-Area Prefix TLV
External Prefix TLV
OSPFv3 Extended Prefix Range TLV FIG. 51 is a prefix-SID 5100 in OSPFv3 according to some embodiments.

FIG. 52 illustrates the 1-octet flags field 5200 in prefix-SID in OSPFv3 according to some embodiments. The flags 5200 include an M-flag to indicate if it is a multi-space prefix SID. If the M-flag is set, then it is a multi-space prefix-SID and there is a 4 octet label space identifier field in the prefix SID before the SID/label/index field.

FIG. 53 is a multi-space prefix-SID 5300 in OSPFv3 when the M-flag is set according to some embodiments.

FIG. 54 is an adjacency SID 5400 in OSPFv3 according to some embodiments.

FIG. 55 is a LAN adjacency SID 5400 in OSPFv3 according to some embodiments.

Figure 56:
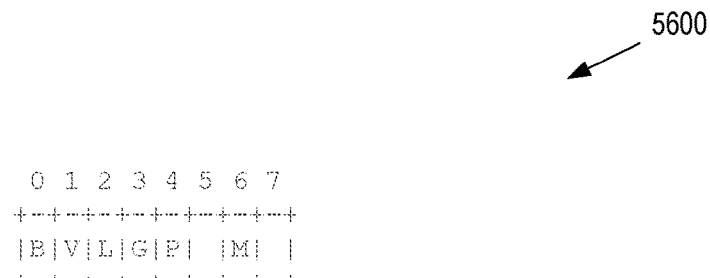
FIG. 56 illustrates the 1-octet flags field in adjacency SID or LAN adjacency SID in OSPFv3 according to some embodiments.

FIG. 56 illustrates the 1-octet flags field 5600 in adjacency SID or LAN adjacency SID in OSPFv3 according to some embodiments. The flags 5600 include an M-flag to indicate if it is a multi-space adjacency SID. If the M-flag is set, then it is a multi-space adjacency SID and there is a 4 octet label space identifier field in the adjacency SID before the SID/label/index field.

Figure 57:
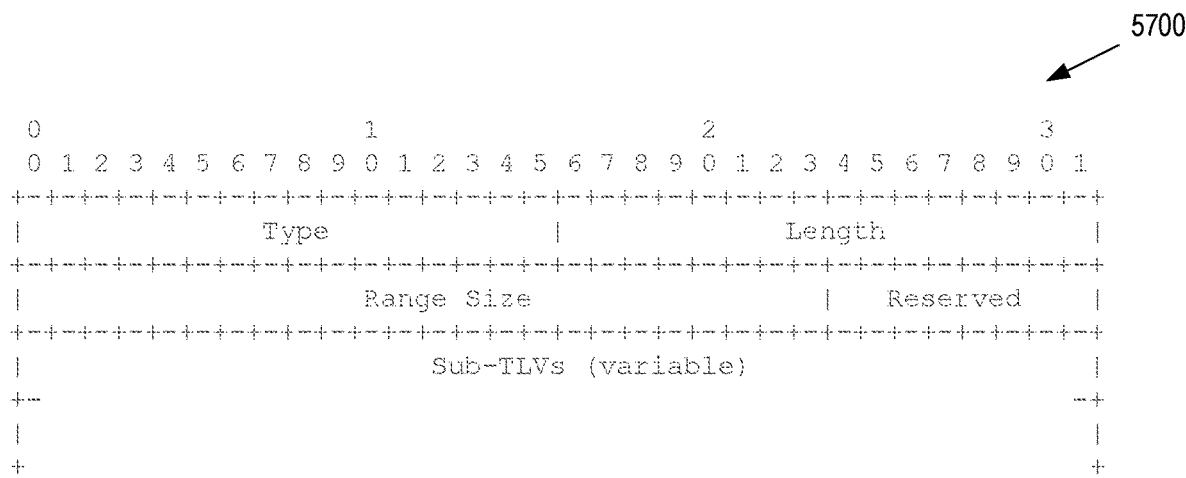
FIG. 57 is an SID/Label range TLV in OSPFv3 according to some embodiments.

FIG. 57 is an SID/Label range 5700 in OSPFv3 according to some embodiments. In this case:
Type: 9
Length: Variable, dependent on Sub-TLVs.

Range Size: 3-octet SID/label range size (i.e., the number of SID or labels in the range including the first SID/label), greater than 0.

Figure 58:
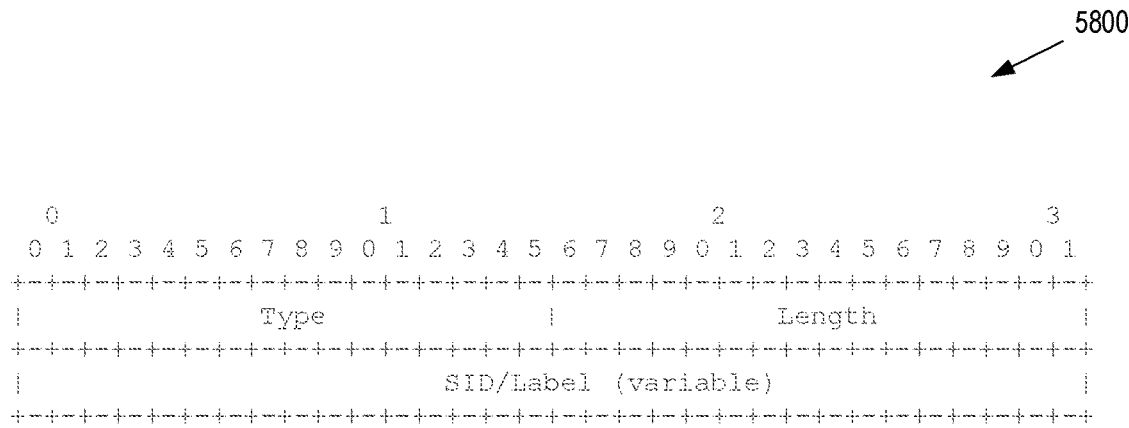
FIG. 58 is an SID/Label Sub-TLV in OSPFv3 according to some embodiments

FIG. 58 is an SID/Label Sub-TLV 5800 in OSPFv3 according to some embodiments. In some cases:

Type: 3

Length: Variable, 3 or 4 octets

SID/Label: If length is set to 3, then the 20 rightmost bits represent a label. If length is set to 4, then the value represents a 32-bit SID.

The receiving router ignores the SID/Label Sub-TLV if the length is other then 3 or 4.

The SID/Label Sub-TLV is included in the SID/Label Range TLV. The SID/Label advertised in the SID/Label Sub-TLV represents the first SID/Label in the advertised range.

Only a single SID/Label Sub-TLV may be advertised in SID/Label Range TLV. If more than one SID/Label Sub-TLVs are present, the SID/Label Range TLV is ignored.

Figure 59:
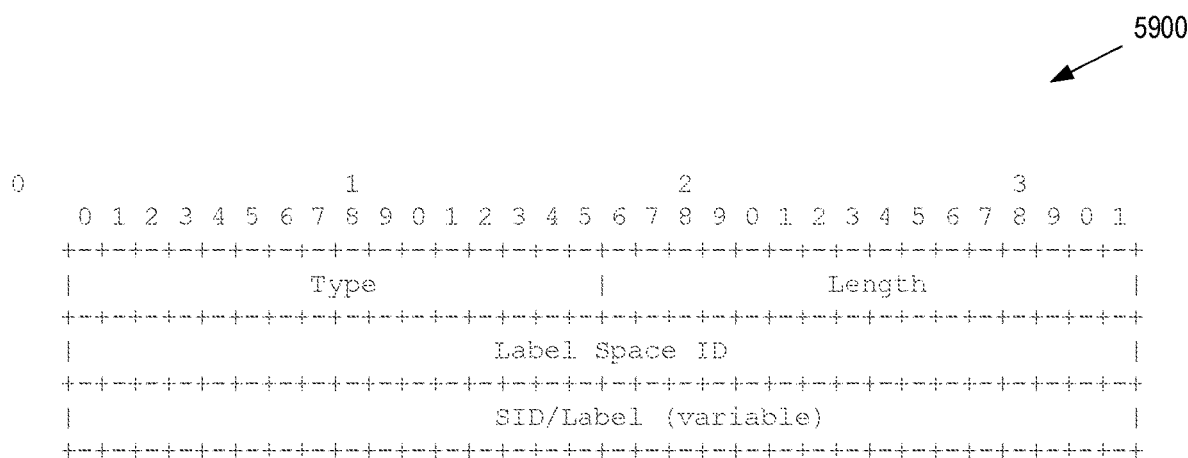
FIG. 59 is a multi-space SID/Label Sub-TLV in OSPFv3 according to some embodiments.

FIG. 59 is a multi-space SID/Label Sub-TLV 5800 in OSPFv3 according to some embodiments. Presence of this Sub-TLV 5800 means the SID/Label carried by it is allocated from the Label Space ID. An OSPFv3 router that supports multiple label spaces sends a SID/Label Range TLV that includes a Multi-Space SID/Label Sub-TLV (type=15). This indicates that the router is capable of forwarding VLS encapsulated packets. Any Multi-Space Prefix SIDs advertised by the router in the form of an index must the offset into the Label space advertised in Multi-Space SID/Label Sub-TLV.

An SR Local Block TLV (SRLB) in OSPFv3 contains the range of labels the node has reserved for local SIDs. SIDs from the SRLB may be used for Adjacency-SIDs, but also by components other than the OSPFv3 protocol. As an example, an application or a controller may instruct the router to allocate a specific local SID. Some controllers or applications may use the control plane to discover the available set of local SIDs on a particular router. In such cases, the SRLB is advertised in the control plane. The SRLB TLV is a top-level TLV of the OSPFv3 Router Information Opaque LSA.

Figure 60:
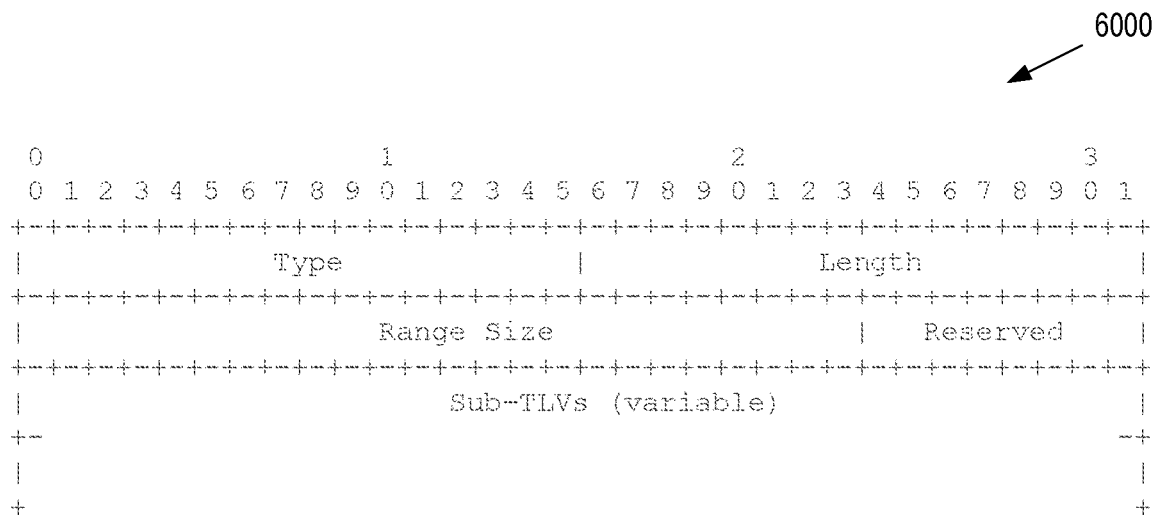
FIG. 60 is a SR Local Block TLV in OSPFv3 according to some embodiments.

FIG. 60 is a multi-space SID/Label Sub-TLV 6000 in OSPFv3 according to some embodiments. In some cases:

Type: 12

Length: Variable, dependent on Sub-TLVs.

Range Size 3-octet SID/label range size (i.e., the number of SIDs or labels in the range including the first SID/label), greater than 0.

Initially, the only supported Sub-TLV is the SID/Label Sub-TLV as defined in Section 2.1. in [SR-CTRL-OSPFv3]. The SID/Label Sub-TLV is included in the SRLB TLV. The SID/Label advertised in the SID/Label Sub-TLV represents the first SID/Label in the advertised range.

Only a single SID/Label Sub-TLV may be advertised in the SRLB TLV. If more than one SID/Label Sub-TLVs are present, the SRLB TLV is ignored.

This invention stipulates a router that supports multiple label spaces may send a SRLB TLV that includes a Multi-Space SID/Label Sub-TLV (type=15). Any Multi-Space Adj-SIDs advertised by the router in the form of an index must the offset into the Label space advertised in Multi-Space SID/Label Sub-TLV in the SRLB TLV.

The flooding scope for IGP based methods of Segment Routing is IGP area-wide. Consequently, the contents of a Link State Database (LSDB) or a Traffic Engineering Database (TED) has the scope of an IGP area and therefore, by using the IGP alone it is not enough to construct segments across multiple IGP Area or AS boundaries. In order to address the need for applications that require topological visibility across IGP areas, or even across Autonomous Systems (AS), the BGP-LS (BGP Link-State) address-family/sub-address-family have been defined to allow BGP to carry Link-State information. The BGP Network Layer Reachability Information (NLRI) encoding format for BGP-LS and a new BGP Path Attribute called the BGP-LS attribute have been defined.

As discussed herein, Segment Routing requires each router to advertise its SR data plane capability and the range of MPLS label values it uses for Segment Routing in the case where global SIDs are allocated (i.e. global indexes).

Figure 61:
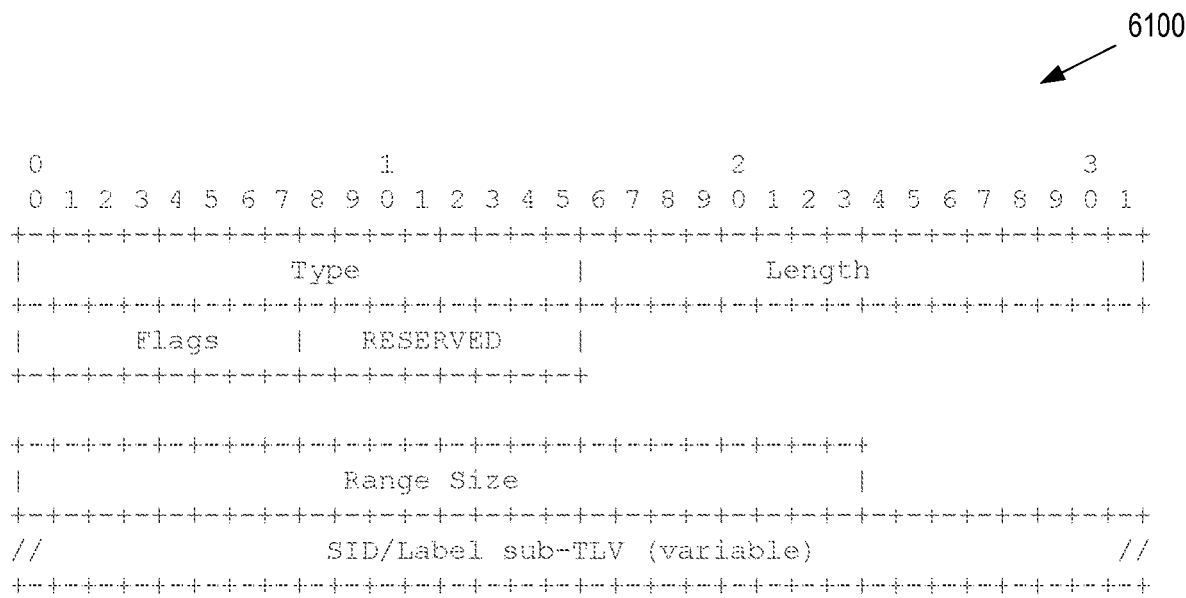
FIG. 61 is an SR Capabilities TLV in BGP-LS according to some embodiments.

FIG. 61 is an SR Capabilities TLV 6100 in BGP-LS according to some embodiments.

FIG. 62 illustrates the 1-octet flags field 6200 according to some embodiments.

I-Flag: MPLS IPv4 flag. If set, then the router is capable of processing SR MPLS encapsulated IPv4 packets on all interfaces.

V-Flag: MPLS IPv6 flag. If set, then the router is capable of processing SR MPLS encapsulated IPv6 packets on all interfaces.

An M-flag is defined as below:

M-Flag: Multi-Space flag. If set, then the router is capable of processing VLS encapsulated SR packets on all interfaces.

SR Capabilities TLV may contain multiple SRGB descriptor entries. Each SRGB descriptor entry has 3-octets of Range and SID/Label Sub-TLV. The SID/Label Sub-TLV contains the first value of the SRGB while the Range contains the number of SRGB elements.

When a label range is allocated by a router that supports multiple label spaces, then SRGB descriptor entry for that range should use Multi-Space SID/Label Sub-TLV instead of SID/Label Sub-TLV.

FIG. 63 is an SID/Label Sub-TLV 6300 in BGP-LS according to some embodiments. In some cases:

Type: 1161

Length: variable, 3 or 4 bytes

SID/Label: if length is set to 3 then the 20 rightmost bits represent a MPLS label.

A Type of SID/Label Sub-TLV is defined and suggests type value as 1162. This type is termed as "Multi-Space SID/Label Sub-TLV". This TLV codepoint needs to be reserved in IANA registry for BGP-LS.

FIG. 64 is a multi-space SID/Label Sub-TLV 6400 in BGP-LS according to some embodiments.

FIG. 65 is an adjacency SID 6500 in BGP-LS according to some embodiments.

Figure 66:
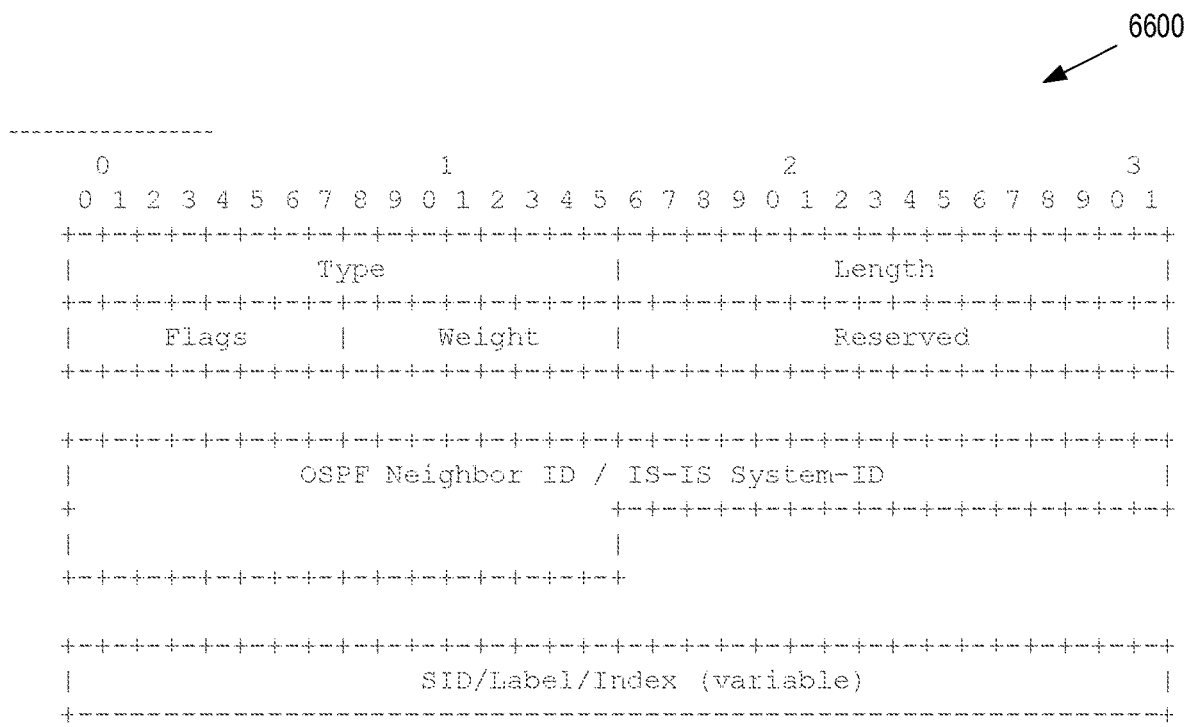
FIG. 66 is a LAN adjacency SID in BGP-LS according to some embodiments.

FIG. 66 is a LAN adjacency SID 6600 in BGP-LS according to some embodiments.

Figure 67:
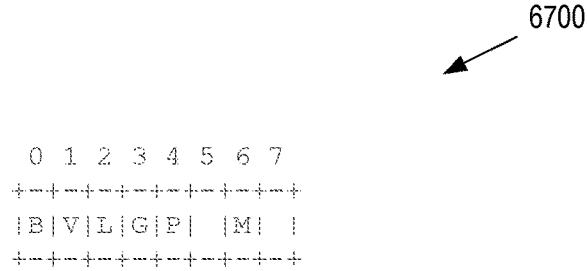
FIG. 67 illustrates the 1-octet flags field in adjacency SID or LAN adjacency SID in BGP-LS according to some embodiments.

FIG. 67 illustrates the 1-octet flags field 6700 in adjacency SID or LAN adjacency SID in BGP-LS according to some embodiments. The flags 6700 include an M-flag to indicate if it is a multi-space adjacency SID or LAN adjacency SID. If the M-flag is set, then it is a multi-space adjacency SID or LAN adjacency SID and there is a 4 octet label space identifier field before the SID/label/index field.

FIG. 68 is a multi-space adjacency SID 6800 in BGP-LS when the M-flag is set according to some embodiments.

FIG. 69 is a multi-space LAN adjacency SID 6900 in BGP-LS when the M-flag is set according to some embodiments.

FIG. 70 is a prefix SID TLV 7000 in BGP-LS according to some embodiments.

The Prefix-SID TLV includes a Flags field. In the context of BGP-LS, the Flags field format and the semantic of each individual flag is taken from the corresponding source protocol (i.e: the protocol of origin of the Prefix-SID being advertised in BGP-LS). If a Prefix TLV is advertised with support for multiple label spaces then the Flags field sets the M-flag in the flag definitions in respective IGPs. if the M-flag is SET, then it is a multi-space Prefix-SID TLV that carries a 4 octets Label Space ID field before the SID/Index/Label field.

FIG. 71 is a multi-space prefix SID TIN 7100 in BGP-LS when the M-bit is set according to some embodiments.

FIG. 72 is a block diagram of a communication system 7200 that includes routers that implement a global label space according to some embodiments. The communication system 7200 includes LSR 7201, 7202, 7203, 7204 which are collectively referred to herein as "the LSR 7201-7204." The labels assigned by the LSR 7201-7204 are network-wide unique. In the illustrated embodiment, a software defined networking (SDN) controller 7205 is used to maintain the globally unique identifiers in the communication system 7200. Globally unique labels are therefore allocated from a label space 7210 that is maintained by the SDN controller 7205.

In the illustrated embodiment, the LSR 7202 provides a label mapping 7215 to the upstream LSR 7201. The label mapping 7215 indicates an FEC F1 and a label L1. The label mapping 7215 is allocated from the label space 7210 and used to program an ILM table 7225 in LSR 7202. This ILM table 7225 can be termed as Global ILM Table as it is programmed with labels from global label space. The LSR 7202 also provides the label mapping 7215 to the upstream LSR 7303. The LSR 7204 provides a label mapping 7230 to the upstream LSR 7203. The label mapping 7230 indicates an FEC F2 and a label L2. The label mapping 7230 is allocated from the label space 7210 and used to program an ILM table 7235 in LSR 4204.

In operation, the LSR 7201 sends a packet P1 of FEC F1 to the LSR 7202 with Label L1, as indicated by the arrow 7245. Note that the MPLS label stack in the packet would have some indicator that L1 is a global label. The LSR 7202 looks up L1 in the Global ILM Table (e.g., the ILM Table 7225) and makes forwarding decision based on the NHLFE of the ILM entry. The LSR 7203 sends a packet P2 of FEC F1 to the LSR 7202 with Label L1, as indicated by the arrow 7250. The LSR 7204 looks up L1 in the Global ILM Table (e.g., the ILM Table 7225) and makes forwarding decision based on the NHLFE of the ILM entry. The LSR 7203 sends a packet P3 of FEC F2 to the LSR 7204 with Label L2, as indicated by the arrow 7255. The LSR 7204 looks up L2 in the Global ILM Table (e.g., the ILM Table 7235) and makes forwarding decision based on the NHLFE of the ILM entry.

Figure 73:
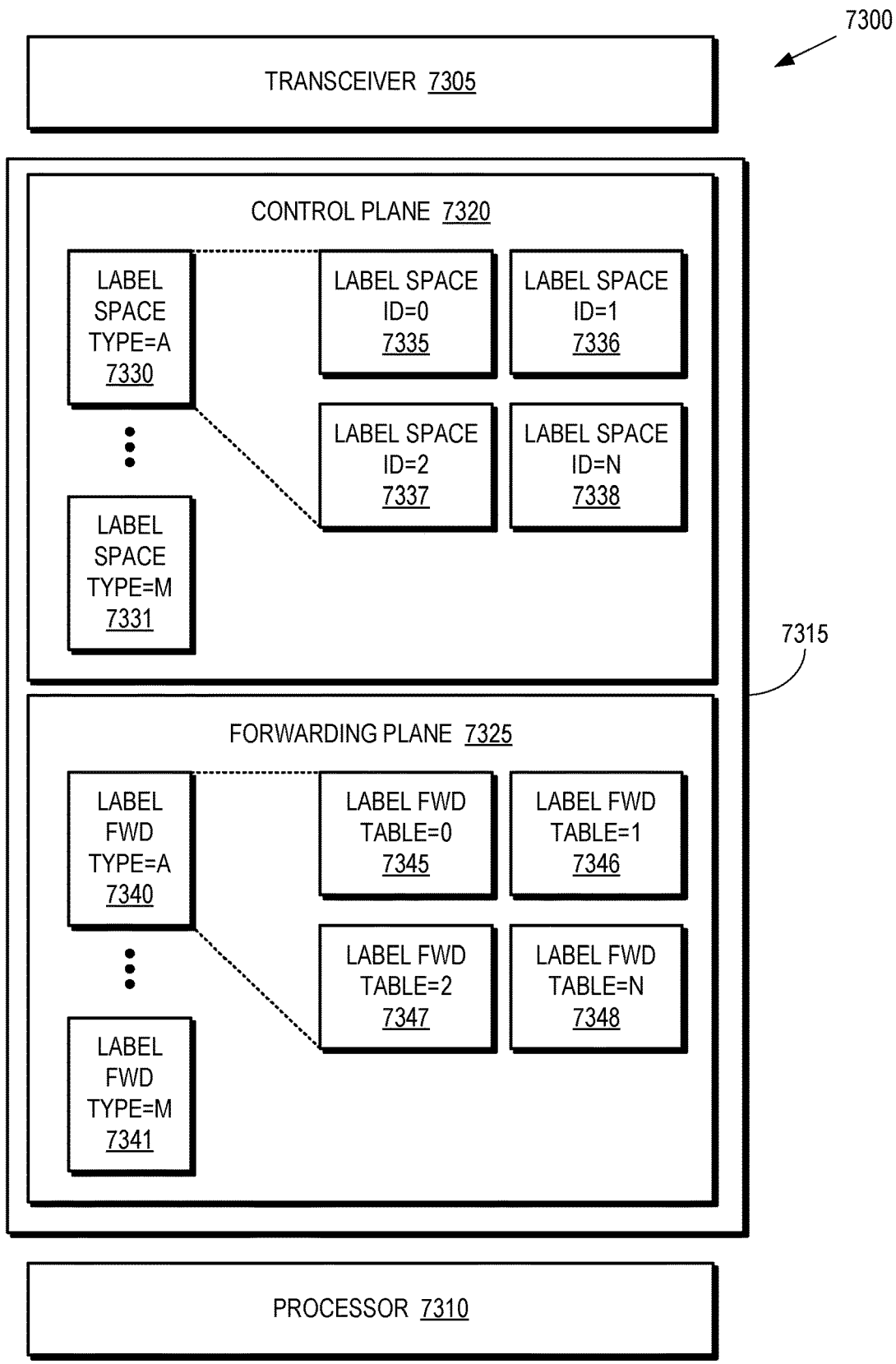
FIG. 73 is a block diagram of a router according to some embodiments.

FIG. 73 is a block diagram of a router 7300 according to some embodiments. The router 7300 is used to implement some embodiments of the routers 120-127 shown in FIG. 1. The router 7300 includes a transceiver 7305 for receiving and transmitting labeled packets, as discussed herein. The router 7300 also includes a processor 7310 and a memory 7315. The processor 7310 executes instructions stored in the memory 7315 and stores information in the memory 7315 such as the results of the executed instructions.

In the illustrated embodiment, the memory 7315 supports a control plane 7320 and a forwarding plane 7325. The control plane 7320 supports multiple label space types such as the label space type A 7330 and the label space type M 7331. For each of the label space types 7330, 7331, the control plane 7320 supports multiple label spaces that are indicated by different label space identifiers such as the label spaces 7335-7338 indicated by the identifiers 1-N. The forwarding plane 7325 supports multiple label forwarding types such as the label forwarding type A 7340 and the label forwarding type M 7341. For each of the local forwarding types 7340, 7341, the forwarding plane 7325 supports label forwarding tables 7345-7348.

In some embodiments, certain aspects of the techniques described above may implemented by one or more processors of a processing system executing software. The software comprises one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

A computer readable storage medium may include any storage medium, or combination of storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

As used herein, the term "circuitry" may refer to one or more or all of the following:
a) hardware-only circuit implementations (such as implementations and only analog and/or digital circuitry) and
b) combinations of hardware circuits and software, such as (as applicable):
  i. a combination of analog and/or digital hardware circuit(s) with software/firmware and
  ii. any portions of a hardware processor(s) with software (including digital signal processor(s), software, and memory(ies) that work together to cause an apparatus, such as a mobile phone or server, to perform various functions) and
c) hardware circuit(s) and/or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in a server, a cellular network device, or other computing or network device.

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. An apparatus comprising:
   a memory configured to store, for a label space type, a first label space having a first label space identifier assigned thereto and a second label space having a second label space identifier assigned thereto, wherein the first label space includes a first set of labels and the second label space includes a second set of labels, wherein at least one label is common to the first set of labels and the second set of labels; and
   a processor configured to support communication of a packet based on the first label space of the label space type, wherein the packet includes a first Multiprotocol Label Switching header including a first label value field used for encoding the first label space identifier of the first label space and a second Multiprotocol Label Switching header including a second label value field used for encoding one of the labels from the first set of labels of the first label space.

2. The apparatus of claim 1, wherein the label space type includes at least one of a per-interface label space, a per-platform label space, a global label space, a downstream-assigned label space, or an upstream-assigned label space.

3. The apparatus of claim 1, wherein the memory is configured to store a number of entries corresponding to a predetermined number of bits that represent the labels included in the entries.

4. The apparatus of claim 3, wherein the entries correspond to Multiprotocol Label Switching label stack entries, and wherein the entries include a label value, a traffic class field that indicates quality of service (QoS) priority and congestion, a bottom of stack flag bit that, if set, indicates that the current label is the last label in the stack, and a time-to-live (TTL) field.

5. The apparatus of claim 1, wherein the processor is configured to generate a first mapping of the first labels in the first label space to a first forwarding equivalency class (FEC), and wherein the first mapping is associated with the first label space identifier of the first label space.

6. The apparatus of claim 5, wherein the processor is configured to distribute the first mapping to at least one upstream router in a communication system.

7. The apparatus of claim 5, wherein the processor is configured to distribute the first mapping to at least one downstream router in a communication system.

8. The apparatus of claim 5, wherein the processor is configured to receive a second mapping of the second labels in the second label space to a second FEC, and wherein the second mapping is associated with the second label space identifier of the second label space.

9. The apparatus of claim 8, wherein the processor is configured to receive the second mapping from at least one upstream router in a communication system.

10. The apparatus of claim 8, wherein the processor is configured to receive the second mapping from at least one downstream router in a communication system.

11. The apparatus of claim 8, further comprising:
    a plurality of incoming label map (ILM) tables associated with a plurality of label space identifiers including the first label space identifier and the second label space identifier.

12. The apparatus of claim 11, wherein the processor is configured to program a first one of the plurality of ILM tables associated with the first label space identifier based on the first mapping, and wherein the processor is configured to program a second one of the plurality of ILM tables associated with the second label space identifier based on the second mapping.

13. The apparatus of claim 11, wherein the processor is configured to encode packets in an FEC using a tuple that includes a label space identifier and a label associated with the FEC, and wherein the processor is configured to transmit the packets along a virtual link associated with the label space identifier and the label.

14. The apparatus of claim 11, wherein the processor is configured to receive packets comprising a tuple that includes a label space identifier and a label associated with an FEC, and wherein the processor is configured to identify the label and the label space identifier in the tuple.

15. The apparatus of claim 14, wherein the processor is configured to identify one of the plurality of ILM tables based on the label space identifier and to determine forwarding information for the received packets based on an entry in the identified one of the plurality of ILM tables that is indicated by the label in the tuple.

16. The apparatus of claim 15, wherein the processor is configured to forward the packets based on the forwarding information in the entry of the identified one of the plurality of ILM tables.

17. The apparatus of claim 16, wherein the processor is configured to push a new tuple onto packets prior to forwarding the packets.

18. A method comprising:
    storing, for a label space type, a first label space having a first label space identifier assigned thereto and a second label space having a second label space identifier assigned thereto, wherein the first label space includes a first set of labels and the second label space includes a second set of labels, wherein at least one label is common to the first set of labels and the second set of labels; and supporting communication of a packet based on the first label space of the label space type, wherein the packet includes a first Multiprotocol Label Switching header including a first label value field used for encoding the first label space identifier of the first label space and a second Multiprotocol Label Switching header including a second label value field used for encoding one of the labels from the first set of labels of the first label space.

19. The method of claim 18, wherein the label space type includes at least one of a per-interface label space, a per-platform label space, a global label space, a downstream-assigned label space, or an upstream-assigned label space.

20. The method of claim 18, wherein storing the labels comprises storing a number of entries corresponding to a predetermined number of bits that represent the labels included in the entries.

21. The method of claim 20, wherein storing the labels comprises storing Multiprotocol Label Switching label stack entries that comprise a label value, a traffic class field that indicates quality of service (QoS) priority and congestion, a bottom of stack flag bit that, if set, indicates that the current label is the last label in the stack, and a time-to-live (TTL) field.

22. The method of claim 18, further comprising:
generating a first mapping of the first labels in the first label space to a first forwarding equivalency class (FEC); and
associating the first mapping with the first label space identifier of the first label space.

23. The method of claim 22, further comprising:
distributing the first mapping to at least one upstream router in a communication system.

24. The method of claim 22, further comprising:
distributing the first mapping to at least one downstream router in a communication system.

25. The method of claim 22, further comprising:
receiving a second mapping of the second set of labels in the second label space to a second FEC, and wherein the second mapping is associated with the second label space identifier of the second label space.

26. The method of claim 25, wherein receiving the second mapping comprises receiving the second mapping from at least one upstream router in a communication system.

27. The method of claim 25, wherein receiving the second mapping comprises receiving the second mapping from at least one downstream router in a communication system.

28. The method of claim 25, further comprising:
programming a plurality of incoming label map (ILM) tables associated with a plurality of label space identifiers including the first label space identifier and the second label space identifier.

29. The method of claim 28, wherein programming the plurality of ILM tables comprises programming a first one of the plurality of ILM tables associated with the first label space identifier based on the first mapping, and wherein programming the plurality of ILM tables comprises programming a second one of the plurality of ILM tables associated with the second label space identifier based on the second mapping.

30. The method of claim 28, further comprising:
encoding packets in an FEC using a tuple that includes a label space identifier and a label associated with the FEC; and
transmitting the packets along a virtual link associated with the label space identifier and the label.

31. The method of claim 28, further comprising:
receiving packets comprising a tuple that includes a label space identifier and a label associated with an FEC; and
identifying the label and the label space identifier in the tuple.

32. The method of claim 31, further comprising:
identifying one of the plurality of ILM tables based on the label space identifier; and
determining forwarding information for the received packets based on an entry in the identified one of the plurality of ILM tables that is indicated by the label in the tuple.

33. The method of claim 32, further comprising:
forwarding the packets based on the forwarding information in the entry of the identified one of the plurality of ILM tables.

34. The method of claim 33, further comprising:
pushing a new tuple onto the packets prior to forwarding the packets.

35. An apparatus comprising:
at least one processor; and
at least one memory storing instructions that, when executed by the at least one processor, cause the apparatus at least to perform:
storing, for a label space type, a first label space having a first label space identifier assigned thereto and a second label space having a second label space identifier assigned thereto, wherein the first label space includes a first set of labels and the second label space includes a second set of labels, wherein at least one label is common to the first set of labels and the second set of labels; and
supporting communication of a packet based on the first label space of the label space type, wherein the packet includes a first Multiprotocol Label Switching header including a first label value field used for encoding the first label space identifier of the first label space and a second Multiprotocol Label Switching header including a second label value field used for encoding one of the labels from the first set of labels of the first label space.

* * * * *